US009361102B2

(12) United States Patent
Tan et al.

(10) Patent No.: US 9,361,102 B2
(45) Date of Patent: Jun. 7, 2016

(54) METHODS FOR ENFORCING CONTROL FLOW OF A COMPUTER PROGRAM

(71) Applicant: LEHIGH UNIVERSITY, Bethlehem, PA (US)

(72) Inventors: Gang Tan, Center Valley, PA (US); Ben Niu, Bethlehem, PA (US)

(73) Assignee: Lehigh University, Bethleham, PA (US)

( * ) Notice: Subject to any disclaimer, the term of this patent is extended or adjusted under 35 U.S.C. 154(b) by 0 days.

(21) Appl. No.: 14/734,601

(22) Filed: Jun. 9, 2015

(65) Prior Publication Data
US 2015/0370560 A1    Dec. 24, 2015

Related U.S. Application Data

(60) Provisional application No. 62/009,539, filed on Jun. 9, 2014, provisional application No. 62/172,924, filed on Jun. 9, 2015.

(51) Int. Cl.
*G06F 9/44*   (2006.01)
*G06F 9/30*   (2006.01)
*G06F 21/62*  (2013.01)
*G06F 9/45*   (2006.01)

(52) U.S. Cl.
CPC .............. *G06F 9/30058* (2013.01); *G06F 8/41* (2013.01); *G06F 21/6209* (2013.01)

(58) Field of Classification Search
None
See application file for complete search history.

(56) References Cited

U.S. PATENT DOCUMENTS

| 8,646,050 | B2 * | 2/2014 | Vidrine | G06F 21/57 717/146 |
| 2011/0191848 | A1 * | 8/2011 | Zorn | G06F 11/00 726/22 |
| 2013/0283017 | A1 * | 10/2013 | Wilkerson | G06F 9/322 712/225 |
| 2014/0006752 | A1 * | 1/2014 | Morrow | G06F 9/3848 712/205 |
| 2014/0283036 | A1 * | 9/2014 | Salamat | G06F 21/51 726/22 |
| 2015/0356294 | A1 * | 12/2015 | Tan | G06F 21/53 726/22 |

OTHER PUBLICATIONS

Abadi, M., et al., 2005, "Control-Flow Integrity: Principles, Implementations, and Applications", in Proc. 12th ACM Conf. on Computer and Communications Security (CCS'05).

(Continued)

*Primary Examiner* — Philip Wang
(74) *Attorney, Agent, or Firm* — Saul Ewing LLP

(57) ABSTRACT

One aspect of the invention provides a method of controlling execution of a computer program. The method comprises the following runtime steps: parsing code to identify one or more indirect branches; creating a branch ID data structure that maps an indirect branch location to a branch ID, which is the indirect branch's equivalence class ID; creating a target ID data structure that maps a code address to a target ID, which is an equivalence class ID to which the address belongs; and prior to execution of an indirect branch including a return instruction located at an address: obtaining the branch ID associated with the return address from the branch ID data structure; obtaining the target ID associated with an actual return address for the indirect branch from the target ID data structure; and comparing the branch ID and the target ID.

29 Claims, 12 Drawing Sheets

(56) References Cited

OTHER PUBLICATIONS

Akritidis, P., et al., 2008, "Preventing memory error exploits with WIT", in Proc. 2008 IEEE Symposium on Security Privacy, 263-277.
Ansel, J., et al., 2011, "Language-Independent Sandboxing of Just-In-Time Compilation and Self-Modifying Code", in Proc. 32nd ACM SIGPLAN Conf. on Programming Language Design and Implementation.
Blazakis, D., 2010, "Interpreter Exploitation", in Proc. 4th USENIX Conference on Offensive Technologies.
Carlini, N., et al., 2014, "ROP is Still Dangerous: Breaking Modern Defenses", in Proc. 23rd USENIX Security Symposium, 385-399.
Chen, P., et al., 2011, "JITDefender: A Defense against JIT Spraying Attacks", in Proc. 26th IFIP TC 11 International Information Security Conference, 142-153.
Chen, P., et al., 2013, "JIT Safe: a framework against Just-in-time spraying attacks", 7(4) IET Information Security, 283-292.
Davi, L., et al., 2015, "HAFIX: Hardware-Assisted Flow Integrity Extension", in Proc. Design Automation Conf. '15.
Dean, J., et al., 1995, "Optimization of Object-Oriented Programs Using Static Class Hierarchy Analysis", in Proc. European Conferences on Object-Oriented Programming (ECOOP'95).
Dechev, D., 2011, "The ABA Problem in Multicore Data Structueres with Collaborating Operations", in Proc. International Conference on Collaborative Computing: Networking, Applications and Worksharing (CollaborateCom), 158-167.
Deng, L., et al., 2015, "ISboxing: An Instruction Substitution Based Data Sandboxing for x86 Untrusted Libraries", in Proc. 30th IFIP TC 11 International Conference, 386-400.
Erlingsson, U., et al., 2006, "XFI:Software Guards for System Address Spaces", in Proc. OSDI '06: 7th USENIX Symposium on Operating Systems Design and Implementation, 75-88.
Göktas, E., et al., 2012, "Out of Control: Overcoming Control-Flow Integrity", in Proc. IEEE Symp. on Security and Privacy.
Herlihy, M. P., et al., 1990, "Linearizability: A Correctness Condition for Concurrent Objects", 12 ACM Transactions on Programming Languages and Systems, 463-492.
Homescu, A., et al., 2013, "Librando: Transparent Code Randomization for Just-in-Time Compilers", in Proc. ACM Conf. on Computer and Communications Security (CCS'13).
Kuznetsov, V., et al., 2014, "Code-Pointer Integrity", in Proc. 11th USENIX Symposium on Operating Systems Design and Implementation, 147-163.
Li, J., et al., 2010, "Defeating Return-Oriented Rootkits With 'Return-less' Kernels", in Proc. EuroSys'10.
McCamant, S., et al., 2006, "Evaluating SFI for a CISC Architecture", in Proc. Security '06: 15th USENIX Security Symposium, 209-224.
Mellor-Crummey, J., et al., 2003, "Scalable Reader-Writer Synchronization for Shared-Memory Multiprocessors", http://www.cs.rochester.edu/research/synchronization/pseudocode/rw.html.
Mohan, V., et al., 2015, "Opaque Control-Flow Integrity", in Proc. 2015 Network and Distributed System Security Symposium (NDSS '15).
Morrisett, G., et al., 2012, "RockSalt: Better, Faster, Stronger SFI for the x86", in Proc. Programming Language Design and Implementation (PLDI'12).
Niu, B., et al., 2013, "Monitor Integrity Protection with Space Efficiency and Separate Compilation", in Proc. ACM Conf. on Computer and Communications Security (CCS'13).
Niu, B., et al., 2013, "Efficient User-Space Information Flow Control", in Proc. 8th ACM SIGSAC Symposium on Information, Computer and Communications Security (ASIA CCS'13).
Niu, B., et al., 2014, "Modular Control-Flow Integrity", in Proc. ACM SIGPLAN Programming Language Design and Implementation (PLDI'14).
Niu, B., et al., 2014, "RockJIT: Securing Just-In-Time Compilation Using Modular Control-Flow Integrity", in Proc. ACM CCS'14.
Payer, M., et al., 2015, "Fine-Grained Control-Flow Integrity Through Binary Hardening", in Proc. 12th Int. Conf., DIVMA 2015, 144-164.
Pewny, J., et al., 2013, "Control-Flow Restrictor: Compiler-based CFI for iOS", in Proc. Annual Computer Security Applications Conference (ACSAC).
Sehr, D., et al., 2010, "Adapting Software Fault Isolation to Contemporary CPU Architectures", in Proc. 19th USENIX Security Symposium.
Shacham, H., 2007, "The Geometry of Innocent Flesh on the Bone: Return-into-libc without Function Calls (on the x86)", in Proc. 14th ACM Conf. on Computer and Communications Security (CCS'07), 552-561.
Song, C., et al., 2015, "Exploiting and Protecting Dynamic Code Generation", in Proc. 2015 Network and Distributed System Security Symposium (NDSS'15).
Sun, M., et al., 2013, "Bringing Java's Wild Native World under Control", 16(3) ACM Transactions on Information and System Security (TISSEC).
Tice, C., et al. 2014, "Enforcing Forward-Edge Control-Flow Integrity in GCC & LLVM", in Proc. 23rd USENIX Security Symposium, 941-955.
Wahbe, R., et al., 1993, "Efficient Softwware-Based Fault Isolation", SIGOPS '93, 203-216.
Wang, Z., et al., 2010, "HyperSafe: A Lightweight Approach to Provide Lifetime Hypervisor Control-Flow Integrity", in Proc. IEEE Symposium on Security and Privacy, 380-395.
Wei, T., et al., 2011, "INSeRT: Protect Dynamic Code Generation Against Spraying", in Proc. International Conference on Information Science and Technology, 323-328.
Wu, R., et al., 2012, "RIM: a Method to Defend from JIT Spraying Attack", in Proc. 2012 Seventh International Conference on Availability, Reliability and Security, 143-148.
Yee, B. Y., et al., 2009, "Native Client: A Sandbox for Portable, Untrusted x86 Native Code", in Proc. 2009 30th IEEE Symposium on Security and Privacy, 79-93.
Yee, B. Y., et al., 2012, "Native Client: A Sandbox for Portable, Untrusted x86 Native Code", 30th IEEE Symposium on Security and Privacy.
Zeng, B., et al., 2011, "Combining Control-Flow Integrity and Static Analysis for Efficient and Validated Data Sandboxing", in Proc. 18th ACM Conference on Computer and Communications Security (CCS'11).
Zhang, M., et al., 2013, Practical Control Flow Integrity & Randomization for Binary Executables, in 2013 IEEE Symposium on Security and Privacy 559-573.
Zhang, M., et al., 2013, "Control Flow Integrity for COTS Binaries", Proceedings of the 22nd USENIX Security Symposium.
Zhang, M., et al., 2013, "Control Flow Integrity for COTS Binaries", USENIX Security 2013.

\* cited by examiner

METHODS FOR ENFORCING CONTROL FLOW OF A COMPUTER PROGRAM

CROSS-REFERENCE TO RELATED APPLICATION

This application claims priority under 35 U.S.C. §119(e) to U.S. Provisional Patent Application Ser. Nos. 62/009,539, filed Jun. 9, 2014, and 62/172,924, filed Jun. 9, 2015. The entire content of each of these applications is hereby incorporated herein by reference.

STATEMENT REGARDING GOVERNMENT SUPPORT

This invention was made with government support under U.S. National Science Foundation Award No. CCF-1149211. The U.S. government has certain rights in the invention.

BACKGROUND OF THE INVENTION

Many software attacks hijack the control flow of a program to transfer to attacker-injected code, or to a dangerous library function as in return-to-libc attacks, or to some existing code snippet of the program as in Return-Oriented Programming (ROP) attacks.

SUMMARY OF THE INVENTION

One aspect of the invention provides a method of controlling execution of a computer program. The method comprises the following runtime steps: parsing code to identify one or more indirect branches; creating a branch ID data structure that maps an indirect branch location to a branch ID, which is the indirect branch's equivalence class ID; creating a target ID data structure that maps a code address to a target ID, which is an equivalence class ID to which the address belongs; and prior to execution of an indirect branch including a return instruction located at an address: obtaining the branch ID associated with the return address from the branch ID data structure; obtaining the target ID associated with an actual return address for the indirect branch from the target ID data structure; comparing the branch ID and the target ID; and if the branch ID and the target ID differ, preventing execution of the indirect branch.

This aspect of the invention can have a variety of embodiments. The code can reside in multiple modules. The multiple modules can be dynamically loaded. Each of the multiple modules can be separately compiled prior to dynamic loading. Each of the multiple modules can be separately instrumented prior to dynamic loading.

Each step can be performed at runtime.

The method can further include, if the branch ID and the target ID match, permitting execution of the indirect branch.

The branch ID data structure can be an array.

The target ID data structure can be an array of target IDs indexed by code addresses. The array can contain '0' bits at an index associated with a code address if the code address is not a possible indirect-branch target.

The branch IDs and the target IDs can be stored with special bit values in the least significant bit of each byte encoding.

The method can further include: loading the code into a region of memory; and designating that region as executable and readable, but not writable.

The branch ID data structure and the target ID data structure can be stored separately from the code.

The code can be written in C. The code can be written in C++.

Another aspect of the invention provides a method of controlling execution of a computer program by a Just-In-Time (JIT) compiler. The method includes: maintaining a shadow code heap outside the JIT compiler's sandbox the JIT compiler's code heap stored in the JIT compiler's sandbox; as a code region is loaded into the shadow code heap and the JIT compiler's code heap: parsing the code region to identify one or more pseudo-instruction start addresses, indirect branch target addresses, and direct branch target addresses and adding those addresses to a pseudo-instruction start addresses (PSA) set, an indirect branch target addresses (IBT) set, and a direct branch target (DBT) addresses set; verifying that: all members of the IBT set and the DBT set are also members of the PSA set; all indirect branches and memory-write instructions in the new code region are appropriately instrumented; all direct branches in the new code region jump to addresses in the DBT set; and the new code region contains only instructions corresponding to the JIT compiler; upon successful completion of the verifying step, copying the new code region into the shadow code heap: updating a branch ID data structure that maps an indirect branch location to a branch ID and a target ID data structure that maps an address to a target ID with the addresses from the IBT set; and prior to execution of an indirect branch including a return instruction located at an address: obtaining the branch ID associated with the return address from the branch ID data structure; obtaining the target ID associated with an actual return address for the indirect branch from the target ID data structure; comparing the branch ID and the target ID; and if the branch ID and the target ID differ, preventing execution of the indirect branch.

This aspect of the invention can have a variety of embodiments. The shadow code heap can be readable and writable, but not executable. The pseudo-instruction start addresses, the indirect branch target addresses, and the direct branch target addresses can be stored as bitmaps. The verifying step can further include iterating through a Deterministic Finite Automata (DFA) of all possible allowed instruction encoding. The DFA can be generated from a trie structure of all possible allowed instruction encoding.

The method can further include, upon receiving a request to delete the code region from the shadow code heap and the JIT compiler's code heap: determining whether direct branches outside of the code region target any instructions within the code region; removing code-region-related entries from the branch ID data structure and the target ID data structure; determining whether any threads are running or sleeping in the code region. The determining whether any threads are running or sleeping in the code region step can further include waiting until each thread enters runtime code after execution of the removing step. The determining whether any threads are running or sleeping in the code region step can further include: checking each one of a plurality of counters, each counter associated one of the threads after execution of the removing step; incrementing the associated counter each time the associated thread enters the runtime code; and checking whether each one of a plurality of counters has changed.

The method can further include: generating a fine-grained control flow graph (CFG) for the JIT compiler prior to runtime.

Another aspect of the invention provides a method of controlling execution of a computer program. The method includes the following runtime steps: parsing code to identify one or more indirect branches; creating a branch ID data structure that maps an indirect branch location to a branch ID, which is the indirect branch's equivalence class ID; creating a target ID data structure that maps an address to a target ID, which is an equivalence class ID to which the address belongs; and prior to execution of an indirect branch including a return instruction located at an address: obtaining the branch ID associated with the return address from the branch ID data structure; obtaining the target ID associated with an actual return address for the indirect branch from the target ID data structure; marking a link between the branch ID and the return address as active in the branch ID data structure and the target ID data structure; comparing the branch ID and the target ID; and if the branch ID and the target ID differ, preventing execution of the indirect branch.

This aspect of the invention can have a variety of embodiments. The method can further include, if the branch ID and the target ID match, permitting execution of the indirect branch. The marking step can include invoking an idempotent operation. The branch ID data structure can be an array. The target ID data structure can be an array.

BRIEF DESCRIPTION OF THE DRAWINGS

For a fuller understanding of the present invention, reference is made to the following detailed description taken in conjunction with the accompanying drawing figures wherein like reference characters denote corresponding parts throughout the several views.

DEFINITIONS

Figure 1:
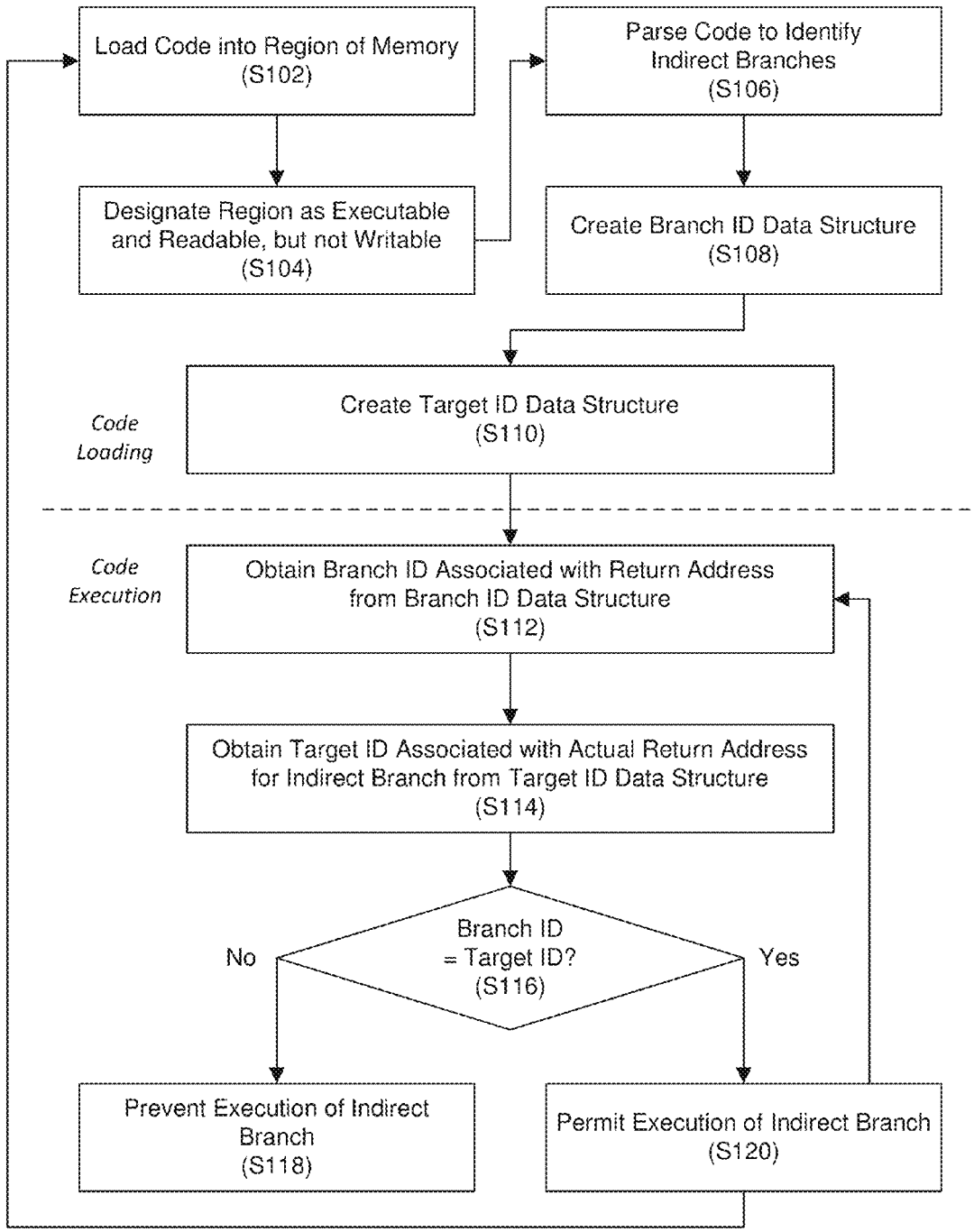
FIG. 1 depicts a method of controlling execution of a computer program according to an embodiment of the invention.

The instant invention is most clearly understood with reference to the following definitions:

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Control-flow attacks can be mitigated by Control-Flow Integrity (CFI). Control-Flow Integrity rewrites a computer program to check indirect branches, i.e., return instructions, indirect jumps (jumps via a register or a memory operand), and indirect calls (calls via a register or a memory operand). As a result, the program's control flow is guaranteed to follow a given Control-Flow Graph (CFG), even under attack.

However, CFI has not seen wide adoption since its debut in 2005. One important factor is the lack of separate compilation capabilities. "Separate compilation" refers to the ability of a compiler to separately compile modules of an application and link the compiled modules. In the context of CFI, it refers to the ability to perform instrumentation of modules separately, without considering other modules, and to link instrumented modules into a working executable. Unfortunately, past CFI techniques require all modules of an application, including libraries, to be available at instrumentation time. For instance, the classic CFI instrumentation inserts identifiers (representing a class of indirect branches and targets) before branch targets and checks before indirect branches to ensure that they jump to targets specified in the CFG. The identifiers are embedded in instructions and cannot appear in the rest of the code. However, this property cannot be guaranteed without inspecting the whole program. Other CFI instrumentation techniques also do not support separate compilation.

The lack of separate compilation is a severe restriction in practice because libraries cannot be instrumented once and reused across programs. CFI implies that each program must include its own instrumented version of libraries. This is especially cumbersome for Dynamic-Link Libraries (DLLs), which are designed to be reused.

Modular Control-Flow Integrity

Referring now to FIG. 1, one aspect of the invention provides a method 100 of controlling execution of a computer program. Steps S102-S110 are generally performed whenever code is loaded for execution, e.g., at startup of a program or when a new module is loaded during execution of the program. Steps S112-S120 are generally performed when the code is executed (e.g., by a processor or CPU).

Advantageously, method 100 can control execution of a computer program having code residing in multiple modules that can be separately compiled and/or instrumented prior to dynamic loading of one or more modules and performance of method 100 at runtime. (As discussed below in the context of FIG. 2, the term "instrumentation" refers to the modification of code to enforce a CFI policy.)

In step S102, code can be loaded into a region memory. The code can be machine code or object code and can be written in a programming language such as assembly, C, C++, C#, Java, and the like. Memory can be volatile or non-volatile memory. In some embodiments, the code is loaded into a "sandbox", i.e., a virtual container in which untrusted programs can be safely run.

In step S104, the region can be optionally designated as executable and readable, but not writable. This prevents modification of the code.

In step S106, the code can be parsed to identify indirect branches. Indirect branches can include return instructions, indirect jumps (jumps via a register or a memory operand), and indirect calls (calls via a register or a memory operand).

In step S108, a branch ID data structure is created. The branch ID data structure can map an indirect branch location to a branch ID. The branch ID can be the indirect branch's equivalence class ID.

In step S110, a target ID data structure is created. The target ID data structure can map an address to a target ID. The target ID can be the equivalence class ID to which the address belongs.

Figure 3:
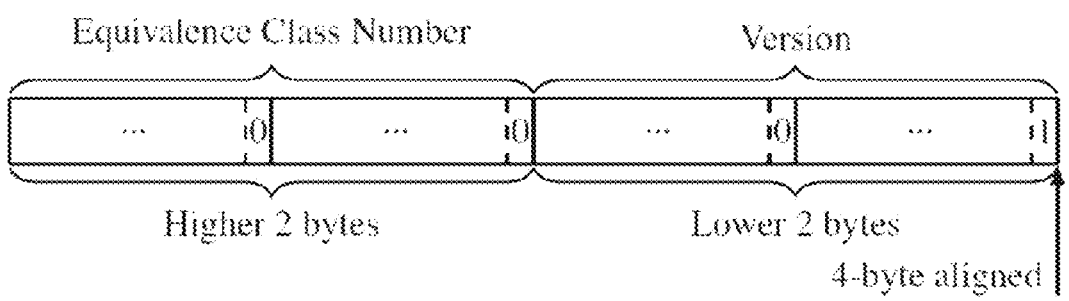
FIG. 3 depicts MCFI ID encoding according to an embodiment of the invention.
Figure 4:
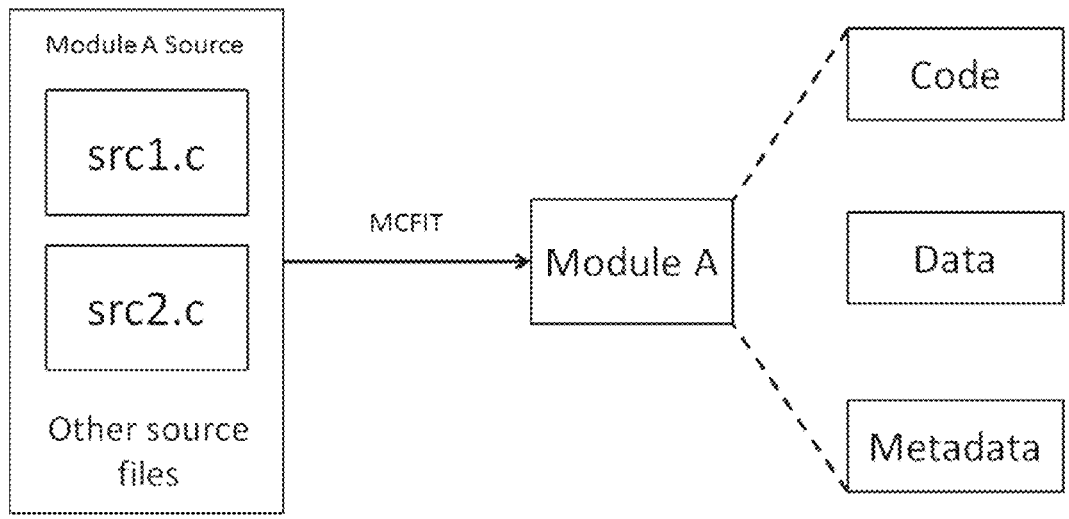
FIG. 4 depicts a schematic of module creation according to an embodiment of the invention.
Figure 5:
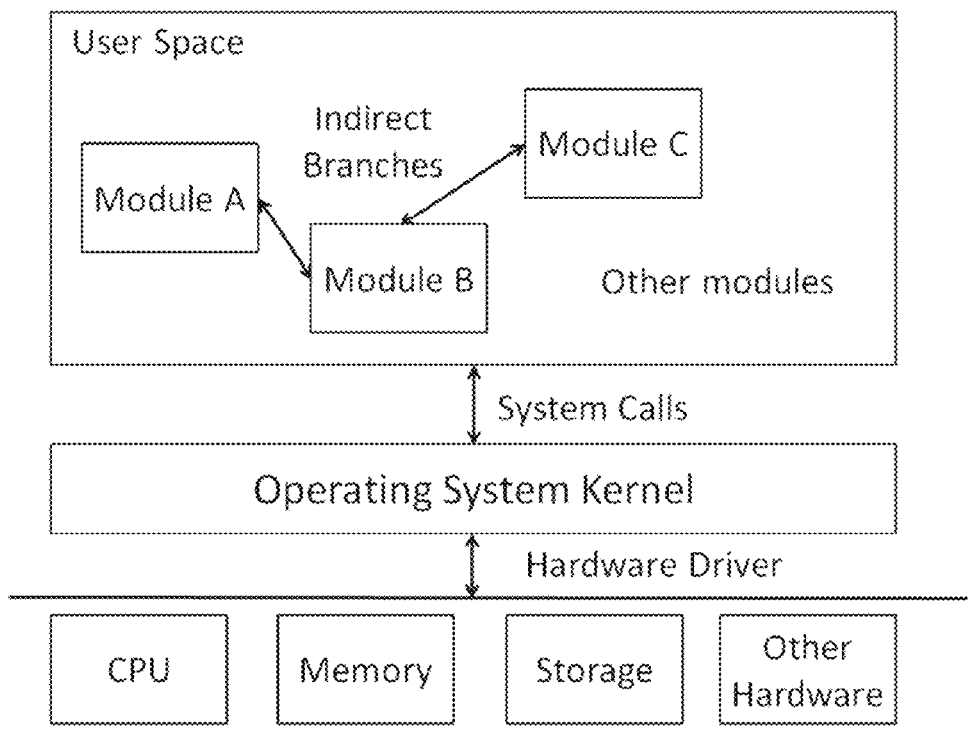
FIG. 5 depicts a schematic of a system for implementing embodiments of the invention.
Figure 6:
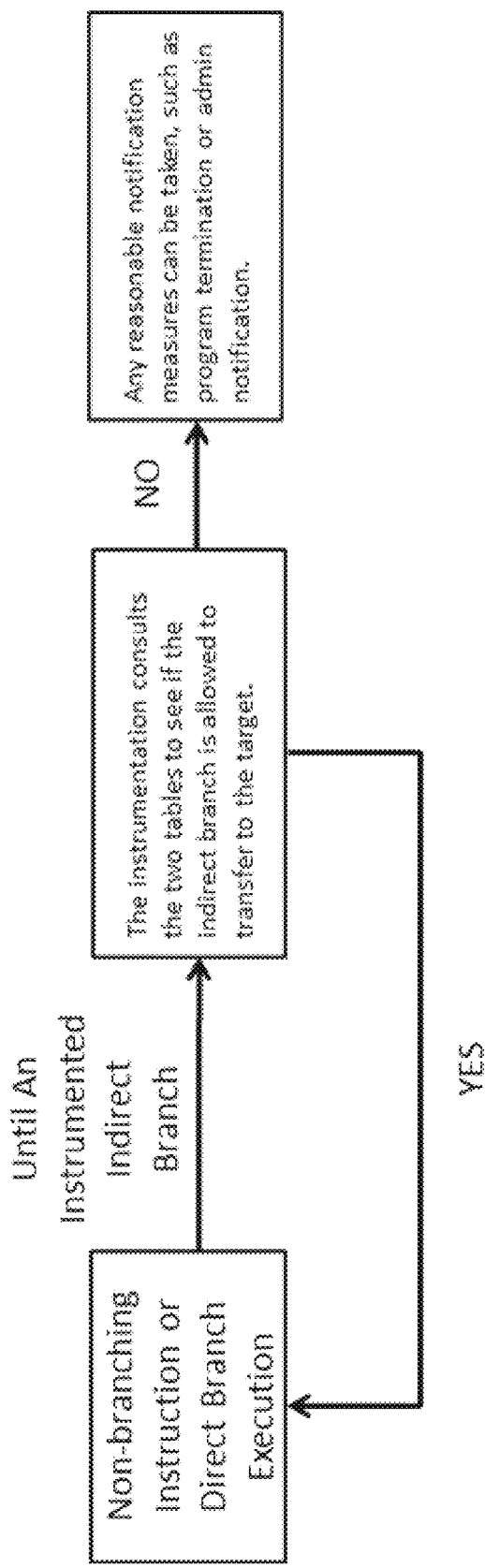
FIG. 6 depicts a method for detecting a CFI violation according to an embodiment of the invention.

The branch ID data structure and target ID data structure can be stored separately from the program code. The branch ID data structure and target ID data structure can be a table or an array. In one embodiment, the target ID data structure is an array of target IDs indexed by code addresses. If the code address is not a possible indirect-branch target, the index for the code address can contain '0' bits. In some embodiments, the branch IDs and/or the target IDs are encoded and stored in a particular format. For example, the branch IDs and/or the target IDs can be stored with special bit values in the least significant bit of each byte encoding. For example, FIG. 3 depicts a 4-byte encoding in which the bytes (considered from high to low bytes) include 0, 0, 0, and 1 in the least significant bit of each byte.

After the code is loaded and the branch ID data structure and target ID data structure are created, the code is executed by a processor or CPU. Prior to execution of an indirect branch, the branch ID associated with the return address is obtained from the branch ID data structure in step S112. In step S114, the target ID associated with an actual return address for the indirect branch is obtained from the target ID data structure. In step S116, the branch ID and the target ID are compared (e.g., by bitwise XORing or other logical comparison). If the branch ID does not equal the target ID, the indirect branch is prevented from execution in step S118. If the branch ID does equal the target ID, execution of the indirect branch is permitted in step S120 and the execution of the program can continue, e.g., by executing the code until another indirect branch is reached at step S112 will be performed or until another module is loaded at which point step S102 will be performed for the new combination of modules.

Embodiments of the invention provide methods, computer-readable media, and systems for implementing Modular Control-Flow Integrity (MCFI), which extends CFI with the support of separate compilation. In MCFI, an application is divided into multiple modules (e.g., one module can be a library). Each module contains code, data, and auxiliary information that helps its linking with other modules and the generation of the module's CFG. Code of a module is instrumented separately for control-flow integrity. When modules are linked either statically or dynamically, their auxiliary information is combined and used to generate a new CFG, which is the new control-flow policy for the combined module after linking. The new policy may allow an indirect branch to target more destinations. For example, suppose a function named f in module $M_1$ contains a return instruction. $M_1$'s internal CFG allows the return instruction to return to any caller of f in $M_1$. After $M_1$ is linked with a second module $M_2$, the return instruction can also return to any caller of f in $M_2$. The important point is that the control-flow policy changes during linking, implying that the policy has to be updated during runtime when loading a dynamically linked library.

The dynamic nature of the control-flow policy when linking libraries poses two main challenges in designing MCFI. First, the policy should be safely and efficiently updated at runtime in the presence of multithreading, e.g., when one thread uses the current policy to decide whether an indirect branch is allowed while another thread concurrently updates the policy to a new one when loading code. Second, a new policy should be generated with high precision when modules are combined.

To address the first challenge, embodiments of the invention represent the CFG in separate tables outside of the code region. To achieve a smooth transition from the old policy to the new one, embodiments of the invention implement table-check and table-update transactions. For example, embodiments of the invention implement a lightweight Software Transactional Memory (STM) implementation that performs table transactions efficiently in MCFI's context.

To address the second challenge, embodiments of the invention augment modules with auxiliary type information and use the type information for CFG generation. Embodiments of the invention compile a module's source code using a modified LLVM compiler (available from www.llvm.org) to acquire the type information.

MCFI is the first efficient CFI instrumentation that supports separate compilation. It addresses the challenge of how to support dynamically linked libraries for CFI in the presence of multithreaded code, using a novel approach based on transactions. MCFI can greatly improve CFI's practicality.

Embodiments of the invention also provide a simple yet effective way of generating CFGs for C programs based on type matching. Embodiments of the invention are efficient and can be used during dynamic linking. Embodiments of the invention generate relatively precise CFGs, while breaking only small portions of C programs. Empirical evidence shows that C programs can be made to be compatible with the CFG-generation process described herein with no or small changes to the source code.

In evaluating MCFI, Applicant implemented a compilation toolchain that instruments C programs for x86. Experiments on SPECCPU2006 benchmarks show that MCFI imposes about 5% execution-time overhead on average.

Control Flow Integrity

A CFI policy for a program is a CFG whose nodes are instructions and whose edges connect instructions to allowed next instructions in control flow. Code C respects its CFI policy P if and only if all control transfers in C, when executed, respect the graph P.

Hereafter, the term "CFI" to refer to the classic CFI as described in M. Abadi et al., "Control-flow integrity," in 12th ACM Conference on Computer and Communications Security (CCS), 340-53 (2005). CFI uses a combination of static and dynamic checks for enforcement. For a direct branch, a static verifier is used to check if its targets are allowed by the CFG. For an indirect branch, CFI inserts runtime checks into the program to ensure that the control transfer is consistent with the CFG. The focus of CFI is how to instrument indirect branches.

First, the set of indirect branch targets is partitioned into equivalence classes. Two target addresses are equivalent if there is an indirect branch that can jump to both targets according to the CFG. An indirect branch is allowed to jump to any destination in the same equivalence class. If two indirect branches target two sets of destinations and those two sets are not disjoint, the two sets are merged into one equivalence class. This results in some CFG precision loss.

After partitioning, each equivalence class is assigned a unique number. An address's Equivalence-Class Number (ECN) refers to the number given to the equivalence class to which the address belongs. The branch ECN of an indirect branch refers to the ECN of the equivalence class to whose addresses the branch can jump. The target ECN of an indirect branch is a dynamic notion and refers to the ECN of the equivalence class in which the actual destination is when the indirect branch runs in a specific state.

Figure 2:
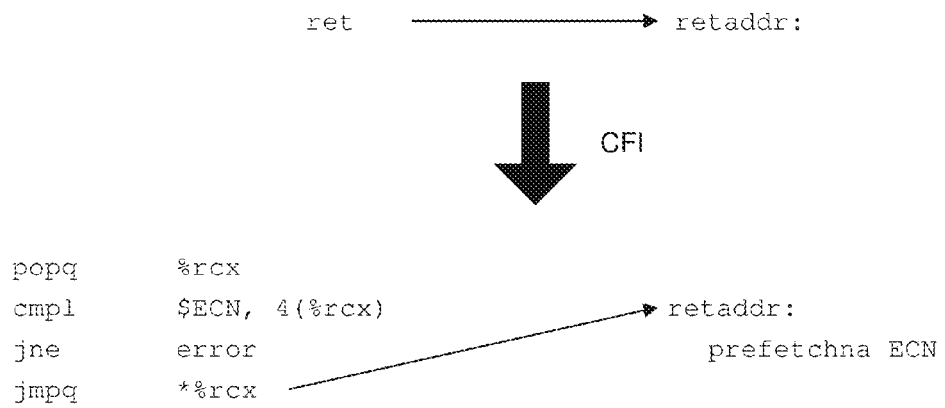
FIG. 2 depicts an example of the classic CFI instrumentation.

For an indirect branch to respect the CFI policy, its branch ECN must be the same as its target ECN. This is enforced by the CFI instrumentation. FIG. 2 shows the instrumentation of a return instruction that jumps to the address retaddr.

At the target, retaddr, CFI inserts a side-effect-free instruction with the target address's ECN embedded. The example uses the prefetchnta instruction, which performs memory prefetching.

The return instruction is rewritten to (1) pop the return address to a temporary register (% rcx in this case); (2) retrieve the target ECN and compare it with the branch ECN using cmpl and jne (the address % rcx+4 points to the middle of prefetchnta if the correct return address is on the stack); (3) transfer control the compared ECNs are the same. In this technique, ECNs are embedded in the non-writable code section. Consequently, an ECN must be unique and cannot overlap with the encoding of instructions in the rest of the code. Otherwise, it would be possible for an indirect branch to jump to more targets than allowed. The global uniqueness requirement prevents the classic CFI from supporting separate compilation because the rewriting cannot be performed without all modules.

MCFI Overview

Embodiments of MCFI enforce fine-grained CFI.

Threat Model

MCFI adopts CFI's concurrent attacker model as described in Abadi. The model allows a strong adversary, which is treated as a separate thread running in parallel with user threads. The attacker thread can read and write any memory (subject to memory page protection). Consequently, the attacker can corrupt writable memory between any two instructions in the user program. It is assumed that machine registers of a thread cannot be directly modified by the attacker thread. However, the attacker can still affect registers indirectly by corrupting memory. As an example, if the program reads from a region of writable memory to a register, then the register's value is under the attacker's control because the attacker can write any value to that region of memory. In addition, to prevent arbitrary code execution, a trusted MCFI runtime enforces the invariant that no memory regions are both writable and executable at the same time. The invariant is enforced when an application is initially loaded by the runtime. The runtime sets up a separate code and data region. Code is loaded into the code region, which is executable and readable but not writable. Note that the code region can include some read-only data such as jump tables. The data region is readable and certain parts are writable, but not executable. The invariant also holds when dynamically linking libraries. New libraries are loaded into unoccupied parts in the code and data region.

ID Tables

MCFI partitions indirect branch targets into equivalence classes and labels each with an ECN. To remove the global uniqueness requirement in the classic CFI, ECNs are pulled out of the code section and stored in a runtime data structure consisting of two separate tables. These tables are conceptually maps from addresses to IDs. An ID is a unique identifier associated with an address. It contains an ECN and other components (the format of an ID is detailed later). The branch ID table, called the Bary table, maps from an indirect-branch location to the location's branch ID, which is the identifier of the equivalence class of addresses the branch is allowed to jump to. The target ID table, called the Tary table, maps from an address to the identifier of the equivalence class to which the address belongs.

With the ID tables, instrumenting an indirect branch is straightforward. Take the example of a return instruction located at address l. The instrumentation can first use the Bary table to look up the branch ID for address l, use the Tary table to look up the target ID for the actual return address, and check whether the branch ID is the same as the target ID.

Separating IDs from code has several benefits. First, IDs in the tables can overlap with the numbers in the code section, eliminating the global ID uniqueness assumption in the classic CFI. Second, the instrumentation code before indirect branches is parameterized over the ID tables and remains the same once loaded. Therefore, code pages for applications and libraries can be shared among processes, saving memory and application launch time. Third, centralized ID tables enable favorable memory cache effect and fast table updates using parallel memory-copy mechanisms of the CPU.

Table Access Transactions

The ID tables can be accessed concurrently by multiple threads. One thread may dynamically load a module, which triggers the generation of a new CFG. Consequently, a new set of IDs based on the new CFG needs to be put into the ID tables. At the same time, another thread may execute an indirect branch, which requires reading IDs from the tables. Since concurrent reads and writes are possible, a synchronization mechanism must be designed for maintaining the consistency of tables. Otherwise, the tables may reach some intermediate state that allows for illegal control-flow transfers. A simple lock-based scheme for accessing tables could be adopted, but it would incur a large performance penalty due to MCFI's table-read-dominant workloads: dynamic linking is a rare event compared to the use of an indirect branch (especially return instructions). (Even in Just-In-Time (JIT) compilation environments such as the Google V8 JavaScript engine, which optimizes code on-the-fly, the number of indirect branch execution is roughly 108 times of CFG updates triggered by dynamic code installation.)

Embodiments of the invention wrap table operations into transactions and use a custom form of Software Transactional Memory (STM) to achieve safety and efficiency. This STM implementation uses two kinds of transactions.

The first kind is a check transaction (TxCheck). This transaction is executed before an indirect branch. Given the address where the indirect branch is located and the address that the indirect branch targets, the transaction reads the branch ID from the tables, compares the two IDs, and takes actions if the IDs do not match. This transaction performs only table reads.

The second kind is am update transaction (TxUpdate). This transaction is executed during dynamic linking. Given the new IDs generated from the new CFG after linking a library, this transaction updates the Bary and Tary tables.

A transaction-based approach is more efficient because the check transaction performs speculative table reads, assuming there are no other threads performing concurrent writes; if the assumption is wrong, it aborts and retries. This technique matches the context well and provides needed efficiency. Further details about ID tables and table transactions are provided in the "ID Tables and Transactions" section herein.
Module Linking An MCFI module not only contains code and data, but also auxiliary information. There is a range of options about what auxiliary information to attach to a module for CFG generation. In general, the more information that a module carries, the better precision of the generated CFG. MCFI adopts type information, which tells the types of functions and function pointers. The type information is used to generate a CFG for modules. An indirect call via a function pointer can invoke a function as long as the types of the function pointer and the function match. This approach can generate relatively precise CFGs, while requiring modest effort to adapt the source code.
ID Tables and Transactions The detailed design of ID tables and transactions that access the tables is described next including the design for the x86 architecture, including x86-32 and x86-64. Other architectures such as ARM can also be supported with small adjustments.
ID Tables As discussed, MCFI maintains two tables. Both map from addresses to IDs. The Bary table holds branch IDs and the Tary table holds target IDs. An ID is four-byte long, visualized in FIG. 3. An ID is stored in a four-byte aligned memory address so that a single memory access instruction can atomically access it.

An MCFI ID contains several components. The first component is composed of the least significant bits in the four bytes. They are reserved and have the special bit values 0, 0, 0, and 1, from high to low bytes. These reserved bits are to prevent the use of an address that points to the middle of an ID to look up the tables; more on this will be discussed shortly. A valid ID is defined as an ID that has the special bit values at the reserved-bit positions.

An MCFI ID also contains a fourteen-bit target-address ECN in the higher two bytes and a fourteen-bit version number in the lower two bytes. The ECN is the same as in the classic CFI and tells to which equivalence class the address associated with the ID belongs. The ID-encoding scheme allows $2^{14}=16,384$ different equivalence classes in programs. This is sufficient for even large programs, as shown in the experiments described herein. The version number in an ID supports transactions and is used to detect whether a check transaction should be aborted and retried. The ID-encoding also allows $2^{14}$ different version numbers. The implementation of transactions and the sufficiency of $2^{14}$ version numbers are discussed in the "Table Transactions" section herein.

The representation of Bary and Tary tables during runtime is discussed next. Since the Bary and Tary tables are queried frequently, MCFI should utilize an appropriate data structure to minimize the ID-access time. There is a range of potential data structures. A simple approach is to use a hash map that maps from addresses to IDs. This is space efficient, but the downside is that a table access involves many instructions for computing the hash function and even more when there is a hash collision.

MCFI adopts a simple representation of the ID tables. Both Bary and Tary tables are represented using arrays. The Tary table is an array of IDs indexed by code addresses. If a code address is not a possible indirect-branch target, then the corresponding array entry contains all zeros; otherwise, it contains the ID of the code address. This design clearly enables efficient look-ups and updates.

In the case that there is an entry in the table for every code address, the size of the table is four times of the code size since each ID is four bytes long. To have a smaller Tary table, embodiments of the invention use a space-optimization technique that inserts extra no-op instructions into the program to force indirect-branch targets to be four-byte aligned. As a result, the table needs entries only for four-byte aligned code addresses and the size of the Tary table is the same as the code size. During runtime, the Tary table causes only a small increase on the runtime memory footprint because the majority of memory consumed by a program holds runtime data in the heap.

Moreover, embodiments of the invention should prevent programs from using indirect-branch targets that are not four-byte aligned. The reserved bits in an ID enforce this requirement. (Alternatively, an and instruction can be inserted to align the indirect-branch targets by clearing the least two bits.) In particular, if an indirect branch uses an address that is not four-byte aligned, then the four-byte target ID loaded from the Tary table will not be valid (i.e., it will not have the special bit values 0, 0, 0, and 1 in the least-significant bits). Then, the comparison with the branch ID will fail because the branch ID loaded from the Bary table is always valid as discussed next. The Bary table could use the same design as the Tary table, but embodiments of the invention use an optimization to increase its space and time efficiency. Recall that the Bary table conceptually maps indirect-branch locations to branch IDs. One observation is that instruction addresses are known once they are loaded in memory. Therefore, when a module is loaded into the code region, MCFI's loader patches the code to embed constant Bary table indexes that correspond to correct branch IDs in branch-ID read instructions. In this design, the Bary table does not need entries for code addresses that do not hold indirect branches. (In contrast, the Tary table has all-zero entries even for addresses that are illegal indirect-branch targets). Furthermore, all branch IDs loaded from the Bary table are valid IDs as long as the loader embeds the correct table indexes in branch-ID read instructions.

Finally, the tables should be protected at runtime so that application code cannot directly change them. Embodiments of the invention adopt MIP's design described in B. Niu & G. Tan, "Monitor integrity protection with space efficiency and separate compilation," in *Proc. of the* 2013 *ACM SIGSAC Conference on Computer & Communications Security* (CCS '13) 199-210, (2013) to restrict the memory region where application code can write so that it cannot directly modify the tables. A brief summary of this code sandboxing technique is as follows. On x86-32, memory segmentation is used as described in NaCl by B. Yee et al., "Native client: A sandbox for portable, untrusted x86 native code," in *IEEE Symposium on Security and Privacy* (*S&P*) (2009). A 1 GB segment is reserved for running the application code and another 1 GB segment is reserved for the table region. x86-64, however, does not support memory segmentation. Instead, memory writes are instrumented so that they are restricted to the [0, 4 GB) memory region. Another 4 GB memory region is reserved for tables. To access table entries efficiently, a spare segment register is used to be the base address of the table region: % fs is used in x86-32 and % gs in x86-64.

Table Transactions

Embodiments of the invention can utilize standard STM algorithms to implement the transactions. However, those algorithms are generic and separate meta-data (e.g., the version numbers) from real data (the ECNs). As a result, they require multiple instructions for retrieving meta-data and real data, and multiple instructions for comparing meta-data and real data to check for transaction failure and CFI violation. Applicant micro-benchmarked the TML algorithm, a state-of-the-art STM algorithm particularly optimized for read-dominant workloads described in L. Dales sandro et al., "Transactional mutex locks," in *Proceedings of the 16th International Euro-Par Conference on Parallel Processing: Part II* (*Euro-Par* '10) 2-13 (2010), and found its slowdown is around 100% more than MCFI's custom transaction algorithm, which puts meta-data and real data in a single word. The compact representation enables MCFI to use a single instruction to retrieve both meta- and real-data and a single instruction to check for transaction failure.

Update Transactions

When a library is dynamically linked, MCFI produces a new CFG for the program after linking. The "Module Linking" section herein presents MCFI's method for generating the new CFG; this section is agnostic to the details of such a method. Based on the new CFG, a new set of Equivalence Class Numbers (ECNs) is assigned to equivalence classes induced by the new CFG. The rest of this section assumes the existence of two functions that return the new ECNs.

The getBaryECN function takes a code address as input and, if there is an indirect branch at that address, returns the branch ECN of the indirect branch. The getBaryECN function returns a negative number if there is no indirect branch at the address.

The getTaryECN function takes a code address as input and, if the address is a possible indirect-branch target, returns the address's ECN (i.e., the ECN of the equivalence class to which the address belongs). The getTaryECN function returns a negative number if the code is not a possible indirect-branch target.

Appendix A presents the pseudocode that implements update transactions. It is implemented inside MCFI's runtime and is used by MCFI's dynamic linker to update the ID tables.

An update transaction starts by acquiring a global update lock and incrementing a global version number. The lock serializes update transactions among threads. This simple design takes advantage of the fact that update transactions are rare in practice and allowing concurrency among update transactions does not gain much efficiency. The global update lock does not prevent concurrency between update transactions and check transactions.

The update transaction performs table updates in two steps: first update the Tary table, and then the Bary table. The separation of the two steps is achieved by a memory write barrier at line 5, which guarantees that all memory writes to Tary finish before any memory write to Bary. Bary and Tary table updates cannot be interleaved; otherwise, at some intermediate state in an update transaction, some IDs in the Tary and Bary tables would have the old version and some IDs would have the new version. Consequently, check transactions would use different versions of CFGs for different indirect branches. By updating one table first before updating the other, check transactions either use the old CFG or the new CFG for all indirect branches at all times.

Function updTaryTable first constructs a new Tary table (line 11). Constants CodeBase and CodeLimit are the code region base and limit, respectively. The table construction process iterates each four-byte aligned code address, invokes getBaryECN, and updates the appropriate entry in the table. The auxiliary function setECNAndVer updates the table entry with the ECN and the global version number; its code is omitted for brevity. After construction, the new Tary table is copied to the Tary table region with the base address in TaryTableBase (line 20). The copyTaryTable implementation is critical to the performance of update transactions. Table entries can advantageously be updated in parallel; the only requirement is that each ID update should be atomic. Therefore, the weak order memory write instruction movnti, which directly writes data into memory without polluting the cache, is used to perform fast parallel copying.

Function updBaryTable performs similar updates on the Bary table with the help of getBaryECN.

Check Transactions

Check transactions run during the execution of indirect branches. For efficiency, MCFI implements a check transaction as a sequence of machine instructions and instruments an indirect branch to inline the sequence. The sequence is slightly different for each kind of indirect branches (i.e., returns, indirect jumps, and indirect calls). Further, it needs adaptation for different CPU architectures. The x86-64 sequence is presented in this section. The implementation on x86-32 is similar and is omitted for brevity.

Appendix B presents how a check transaction is implemented in assembly for return instructions on x86-64. A return instruction is translated to a popq/jmpq sequence (lines 2 and 9) to prevent a concurrent attacker from modifying the return address on the stack after checking. The movl instruction at line 3 operates on lower four bytes of % rcx and has the side effect of clearing the upper 32 bits of % rcx. As discussed, the sandbox is in the region of [0, 4 GB), so the instruction at line 3 restricts the return address to be within the sandbox. The instruction at line 5 reads the branch ID from a constant index in the Bary table. The instruction at line 6 reads the target ID from the Tary table. As discussed before, the Tary table starts at % gs.

Based on the values of the branch and target IDs, the following four cases may occur.

Case (1)—If the branch ID in % edi equals the target ID in % esi, then instructions at lines 7, 8 and 9 are executed, performing the control transfer. In this case, the target-IDvalidity check, the version check, and the ECN check are completed by a single comparison instruction, making this common case efficient.

Case (2)—If the target address is not four-byte aligned or its corresponding Tary ID contains all zeros, then the target ID in % esi is invalid. The branch ID is always valid, so the ID comparison fails. As a result, instructions at lines 7, 8, 11, 12, and 16 are executed and the program is terminated. In "testb $1, % sil", % sil is the lowest byte in % esi and the instruction tests whether the lowest bit in % sil is 1. If it is not 1, then a violation of the CFI policy occurred because it uses a return address that cannot be a possible target.

Case (3)—If the target ID is valid, but the branch ID in % edi has a different version from the target ID in % esi, instructions at lines 7, 8, 11, 12, 13, and 14 are executed, causing a retry of the transaction. This case happens when an update transaction is running in parallel. The check transaction has to wait for the update transaction to finish updating the relevant IDs.

Case (4)—If the target ID is valid, and the versions of the two IDs are the same, but they have different ECNs, then instructions at lines 7, 8, 11, 12, 13, 14, and 16 are executed and the program is terminated. This case violates the CFI policy.

Indirect calls and jumps can be instrumented similarly with minor adjustments.

Linearizability

The two ID tables can be viewed as a concurrent data structure with two operations (check and update operations). One widely adopted correctness criterion in the literature of concurrent data structures is linearizability, meaning that a concurrent history of operations should be equivalent to a sequential history that preserves the partial order of operations induced by the concurrent history. The ID tables described herein are linearizable. In TxUpdate, the linearization point is right after the memory barrier at line 5. Before the linearization point, TxChecks respect the old CFG; after the point, TxChecks respect the new CFG. In TxCheck, the linearization point is the target ID read instruction at line 6 when the valid target ID has the same version as the branch ID or the target ID is invalid.

The ABA Problem

MCFI's ID-encoding scheme supports $2^{14}$ versions and it might encounter the ABA problem. For example, an attacker may load over $2^{14}$ modules and exhaust the MCFI's version number space. This is unlikely in practice, even for just-in-time compiled code. Security is violated only if the program has at least $2^{14}$ code updates during a check transaction. If this were a concern, MCFI could maintain a counter of executed update transactions and make sure it does not hit $2^{14}$. After completion of an update transaction, if every thread is observed to finish using old-version IDs (e.g., when each thread invokes a system call), the counter is reset to zero. Further, MCFI could use a larger space for version numbers such as 8-byte IDs on x86-64.

Procedure Linkage Table (PLT)

PLT entries are used for dynamic linking. A PLT entry contains an indirect jump whose target depends on the runtime adjustable Global Offset Table (GOT). To accommodate PLT and GOT, MCFI needs to make two adjustments. First, the GOT entries are dynamically adjusted from the address of the linker to the addresses of corresponding library functions; such GOT entry updates are inserted between line 5 and 6 in Appendix A and serialized by another memory write barrier. Second, indirect jumps in the PLT may potentially violate the CFI policy and need to be instrumented with a check transaction as well. The complication is that those indirect jump targets are in the GOT and dynamically adjusted by an update transaction. Therefore, the instrumentation for indirect jumps in the PLT needs to reload the target address from GOT when a transaction is retried.

Module Linking

In addition to code and data, an MCFI module also contains auxiliary information for CFG generation. When MCFI modules are statically or dynamically linked, not only are their code and data linked, but their auxiliary information is also merged into the combined module.

There is a range of choices for what kind of auxiliary information MCFI can attach to a module. The richer the auxiliary information is, the better it can enable the generation of a precise CFG. On the other hand, richer auxiliary information implies more analysis time for generating and merging the information and for producing a CFG from the information. There is a tradeoff between the CFG precision and efficiency because the dynamic linker cannot afford long analysis time.

MCFI attaches type information to modules and uses type matching for fast online CFG generation. Specifically, an MCFI module comes with the types of its functions and its function pointers. The benefit of this design is that it can efficiently generate a relatively precise CFG compared to coarse-grained CFI. Moreover, the type information for an individual module can be generated by an augmented compilation toolchain. For this purpose, a modified LLVM is provided, which propagates types from the source level to low level. Finally, combining type information of multiple modules during linking is a simple union operation.

Type-Matching CFG Generation

Next, it is described how MCFI generates a CFG for a module from its type information. Note that a module may be the result of linking several smaller modules (e.g., the result of linking the main module with a DLL module). Another note is that the current CFG generation embodiment assumes that the module is produced from C code. CFG generation for C++ modules would require handling additional control-flow mechanisms such as exceptions and dynamic dispatch.

The control-flow edges out of non-indirect-branch instructions can be computed from the code itself; indirect branches are discussed below. An indirect call through a function pointer whose type is $\tau^*$ is allowed to call any function as long as (1) the function's address is taken in the code, and (2) the function's type is some $\tau'$ that is structurally equivalent to type $\tau$. In structural equivalence, named types are replaced by their definitions. The structural equivalence rule may break some C code, meaning that the produced CFG may not include all control-flow edges necessary for the C code to run. Sufficient conditions for C code not to break are discussed herein.

Indirect jumps can be classified into two categories: intraprocedural and interprocedural control transfers. The former is used by LLVM to compile switch or indirect goto statements. Their targets are organized in read-only jump tables, which are hard-coded into the program. Such indirect jumps are statically analyzed to determine their control-flow targets using information in the jump tables. The interprocedural indirect jumps implement indirect tail calls. Indirect tail calls are handled using the same typematching approach; that is, an interprocedural indirect jump is allowed to jump to any function whose type is $\tau$, assuming the type of the function pointer used in the indirect jump is $\tau^*$.

To compute control-flow edges out of return instructions, a call graph detailing how functions are called by direct or indirect calls, is constructed. Tail calls are handled in the following way: if in function $f$ there is a call node calling g, and g calls h through a series of tail calls, then an edge from the call node in f to h is added to the call graph. Using the call graph, control-flow edges out of return instructions can be computed: if there is an edge from a call node to a function, then return instructions in the function can return to the return address following the call node.

There are also unconventional control flows to handle. First, longjmp mostly returns (through an indirect jump instruction) to the address set up by a set jmp call. The implementation described herein connects the longjmp's indirect jump to the return address of each setjmp. Second, C allows variable-argument functions. If a function pointer type τ* allows variable arguments, the implementation described herein allows it to invoke any function whose address is taken, whose return type matches, and whose parameter types match the fixed parameter types in τ. For instance, suppose the function pointer has type "int (*) (int, ... )". An indirect call through the pointer can invoke any function whose address is taken, whose return type is int, and whose first parameter type is int. Third, signal handlers do not return to the application's code; instead, it returns to a small code snippet that invokes the sigreturn system call. In the implementation described herein, the code snippet is inlined into signal handlers and thus the return is eliminated. Fourth, inlined assembly code is sometimes used in C code. For instance, the libc library uses inlined assemblies to implement CPU-specific versions of memcpy. For such inlined assembly code, embodiments of the system requires developers to add type annotation for function pointers and functions used in the assembly.

Conditions for Type-Matching CFG Generation

Embodiments of the invention assume the input C program has been preprocessed to satisfy the following conditions before CFG generation. Condition C1 assumes no type casting to or from function pointer types. Condition C2 assumes that the program does not contain assembly code.

Condition C1 disallows explicit or implicit type casts from or to function pointer types. For instance, embodiments of the invention do not allow casting a function pointer of type "void (*) (int)" to type "void (*) (char *)" and make an indirect call through the resulting pointer. Condition C1 implies that only those functions whose addresses are taken can be indirect call targets. Condition C1 includes implicit type casts involving function pointers, for example, when a union type includes a function pointer field or when a struct is cast to another struct that includes a function pointer field whose type is incompatible with the one in the first struct. However, Condition C1 does not include all type casts; only casts involving function pointer types are included.

Violations of Condition C2 requires adding type annotations to assembly code so that the same type-matching approach can be used.

Applicant believes that for well-behaved C programs that satisfy the conditions, the type-matching approach generates CFGs that do not break the code. The conditions essentially enforce a simple type system, ensuring that values of function pointer types cannot be forged.

Applicant investigated the effort required to revise SPEC-CPU2006 C programs to comply with the conditions. Applicant implemented an analyzer on top of the StaticChecker framework of Clang, LLVM's front end. The analyzer over-approximates violations of the two conditions. Violations of Condition C1 are caught easily because the LLVM's internal representation makes all type casts explicit. For Condition C2, the analyzer just reports cases of inlined assemblies.

The analyzer found no violation of C2 in the twelve benchmarks. (However, the libc library used includes inlined assemblies and Applicant manually provided type annotations for them.) All violations found by the analyzer are in related to Condition C1 and summarized in Table 1. For a benchmark, column SLOC lists its lines of source code and column VBE (Violation Before false-positive Elimination) lists the number of C1 violations. While some benchmarks such as gobmk have no violations, two benchmarks, perlbench and gcc, have thousands of violations. Many cases do not lead to actual violations of the CFG built by embodiments of the invention; that is, they are false positives.

TABLE 1

| C1 violations in SPECCPU2006 benchmarks | | | | | | | | |
|---|---|---|---|---|---|---|---|---|
| SPECCPU2006 | SLOC | VBE | UC | DC | MF | SU | NF | VAE |
| Perlbench | 126,345 | 2878 | 510 | 957 | 234 | 633 | 318 | 226 |
| bzip2 | 5,731 | 27 | 0 | 0 | 6 | 4 | 0 | 17 |
| Gcc | 235,884 | 822 | 0 | 0 | 15 | 737 | 27 | 43 |
| Mef | 1,574 | 0 | 0 | 0 | 0 | 0 | 0 | 0 |
| Gobmk | 157,669 | 0 | 0 | 0 | 0 | 0 | 0 | 0 |
| Hmmer | 20,658 | 20 | 0 | 0 | 20 | 0 | 0 | 0 |
| Sjeng | 10,544 | 0 | 0 | 0 | 0 | 0 | 0 | 0 |
| Libquantum | 2,606 | 1 | 0 | 0 | 0 | 0 | 0 | 1 |
| h264ref | 36,098 | 8 | 0 | 0 | 0 | 0 | 0 | 0 |
| Milc | 9,575 | 8 | 0 | 0 | 0 | 0 | 0 | 0 |
| Lbm | 904 | 0 | 0 | 0 | 0 | 0 | 0 | 0 |
| Sphinx | 13,128 | 12 | 0 | 0 | 11 | 1 | 0 | 0 |

Some of the false positives have common patterns and can be easily ruled out by the analyzer. Several patterns are discussed below.

The first pattern is upcasting (UC). C developers sometimes use type casts between structs to emulate features such as parametric polymorphism and inheritance. An abstract struct type is defined and it contains common fields for its subtypes. Then a few concrete struct types are physical subtypes of the abstract struct type (in the sense that they share the same prefix of fields). A function can be made polymorphic by accepting values of the abstract struct type. Callers of the function have to perform type casts. Those type casts are upcasts, which are false positives in embodiments of the invention because the extra fields in a concrete struct cannot be accessed after the cast.

The second pattern is safe down-casting (DC). Downcasts from an abstract struct type to a concrete struct type are in general not safe. However, a common pattern is to have a type tag field in the abstract struct. The runtime type tag encodes the type of a concrete struct when it is cast to the abstract struct. Clearly, if all casts involving the abstract struct type respect a fixed association between tag values and concrete struct types, then those casts can be considered false positives. Such association can be specified manually (or inferred from source code) and fed to the analyzer.

The third pattern concerns the malloc and free functions (MF). The malloc function always returns void*. If it is invoked to allocate a struct that contains function pointers, Condition C1 is violated as it involves a type cast from void* to a struct with function pointers inside. Such violations are considered false positives because if the function pointers inside the struct are used without proper initialization, the C program is not well behaved as it exhibits undefined behavior. Similarly, type casts in invocations of free are also considered false positives.

The fourth pattern concerns safe updates (SU). Updating function pointers with literals are considered false positives. For instance, function pointers may be initialized to be NULL, which involves a cast from integers to function pointers. This is a false positive as dereferencing a null value would crash the program.

The fifth pattern concerns non-function-pointer access (NF). There are some type casts that involve function pointers, but do not use the function pointers after casts. For example, perlbench contains the example if (((XPVLV*)(sv->sv_any))->xlv_targlen) { ... }

Struct XPVLV has a function-pointer field, but after the cast only non-function-pointer fields are used. It is a false positive.

In Table 1, columns "UC", "DC", "MF", "SU" and "NF" list the numbers of false positives removed by the aforementioned elimination methods. Column "VAE" presents the number of cases after elimination. As can be seen from the table, the elimination methods are effective at eliminating a large number of false positives. After the process, seven benchmarks report no violations and need no code fixes. For the other five benchmarks, the remaining cases can be put categorized as Kind K1 in which a function pointer is initialized with the address of a function whose type is incompatible with the function pointer's type or Kind K2 in which a function pointer is cast to another type and cast back to its original type at a later point.

Table 2 reports the number of K1 and K2 cases in the remaining five benchmarks. Row K1-fixed lists the number of cases in K1 that require changes to the source code to generate a working CFG using the type-matching method. None of the cases in K2 required us to change the source code.

TABLE 2

Number of cases for the two kinds of violations

|  | perlbench | bzip2 | gcc | libquantum | milc |
| --- | --- | --- | --- | --- | --- |
| K1 | 4 | 0 | 36 | 1 | 0 |
| K1-fixed | 4 | 0 | 22 | 1 | 0 |
| K2 | 222 | 17 | 7 | 0 | 5 |

Most K1 cases required manual edits to the source code because the unmatched types of function pointers and functions may cause missing edges in the generated CFG. Consider a case in the gcc benchmark that is related to a generic splay tree implementation. Each node in the splay tree has a key typed unsigned long. There is a key-comparison function pointer typed int (*) (unsigned long, unsigned long). In two places, the function pointer is set to be the address of strcmp, whose type is int (*) (const char*, const char*). The CFG generation does not connect the function pointer to strcmp because the function pointer's type is incompatible with strcmp's type. To fix the problem, a strcmp wrapper function that has the equivalent type as the type of the comparison function and makes a direct call to strcmp was added. The key-comparison function pointer is then set to be the address of the wrapper function. All cases in the "K1-fixed" row can be fixed by wrappers or by directly changing the types of function pointers or functions. All K1 cases were fixed cases with 6 lines of code changes for perlbench, about 30 lines for gcc, and 1 line for libquantum. There are 14 K1 cases in gcc that did not require code patches because the involved function pointers are never used (i.e., they are dead code) even though they are initialized with functions of incompatible types.

Four benchmarks report K2 cases. Consider an example in the perlbench program. A function pointer is initially stored in a void* pointer and later the void* pointer is cast back to the original function pointer's type and dereferenced. In perlbench and gcc, there are also cases of downcast without performing dynamic checking on type tags. In these cases, developers decided those downcasts are safe (perhaps through code inspection) to avoid dynamic checks. None of the K2 cases required code changes to generate a working CFG. This was confirmed by running instrumented benchmarks successfully with the provided data sets.

This review using the SPECCPU2006 benchmark shows that the task of making source code comply with the type-matching approach is not onerous and can be achieved with zero or small changes to the code. Furthermore, the empirical investigation suggests that only K1 cases need to be addressed.

Static and Dynamic Linking

In embodiments of the invention, separately compiled and instrumented modules can be statically linked together. MCFI's static linker changes the standard static linker with the phase of combing modules' auxiliary information. It also modifies the standard linker's PLT entry templates to emit MCFI-instrumented PLT entries in lieu of the original unsafe ones. MCFI also allows a multithreaded program to load new libraries dynamically and transfer the control to the libraries' code. The dynamic linking is jointly performed by MCFI's dynamic linker, CFG generator, and runtime. The dynamic linker itself is instrumented by MCFI and runs within the sandbox, same as other program modules. Before any program module is loaded, the dynamic linker is first loaded in memory. The program modules' GOT entries are set to the dynamic linker's entry point. In detail, dynamically linking a library is performed in the following steps.

First, a running program invokes the MCFI's dynamic linker (by jumping to a PLT entry or invoking dl_open) to load a new library. The dynamic linker loads the library in the sandbox and sets the library code to be writable but not executable. Then, the linker analyzes the library and generates new PLT target addresses.

Second, the linker invokes the CFG generator to generate a new CFG for the original program with the new library. PLT entries are connected to functions with matching names. New IDs are generated for the Bary and Tary tables. Further, the runtime patches the in-sandbox library so that the library's code has the Bary table indexes embedded in instructions that read branch IDs. Next, the code pages are set to read-only and statically verified to obey the CFI policy (the verifier will be discussed in the "MFCI's Toolchain" section). Then, the code pages of the library are set to be executable, but not writable.

Third, the linker passes the new PLT target addresses to the runtime and executes an update transaction, adjusting the IDs in the tables as well as modifying entries in the GOT to use the new PLT target addresses.

MCFI's Toolchain

Applicant implemented an MCFI toolchain on x86-32/64 Linux. The toolchain includes a rewriter that performs program instrumentation, a static linker that combines modules and emits instrumented PLT entries, a CFG generator that collects auxiliary module information and constructs CFGs, a verifier that checks whether an MCFI module is instrumented to respect its CFG, a runtime system that loads and executes instrumented programs, and a dynamic linker that is invoked by the runtime to load libraries dynamically.

MCFI's rewriter (4000 lines of C++ code) is implemented inside the LLVM compilation framework (version 3.3). Three passes are inserted into LLVM's backend to reserve scratch registers used in TxCheck transactions, dump type information, and perform instrumentation. These three passes operate on LLVM's machine-dependent representation and execute after LLVM IR-level passes. The augmented LLVM framework is used to generate instrumented x86 machine code and auxiliary type information.

MCFI's CFG generator is a 500-line C++ program, implementing the CFG generation process described in the "Module Linking" section herein. The CFG generator takes a module's auxiliary type information and generates Bary and Tary tables. The type-based approach enables fast construction of those tables. For example, the CFG generator generates Bary and Tary tables in about 150 milliseconds for gcc, whose code size is about 2.7 MB.

Applicant also implemented an independent verifier (4000 lines of C++ code on top of the LLVM instruction decoder) that performs modular verification of MCFI modules. The verifier takes an MCFI module, disassembles the module, and checks whether indirect branches are instrumented as required. Memory writes remain in the sandbox (so that the tables are protected) and no-ops are inserted to make indirect-branch targets aligned. The auxiliary type information in an MCFI module enables the complete disassembly of the module because it tells all possible targets of indirect branches (as described in the CFG generation process). The verifier removes the rewriter outside of the trusted computing base.

MCFI's runtime system loads and runs MCFI modules. The runtime is based on the MIP runtime described in Niu & Tan with 200 lines changed. The runtime invokes the CFG generator to generate tables in memory. The runtime does not allow modules to directly invoke native system calls. Instead, it wraps system calls as API functions and checks their arguments.

For instance, when mmap is invoked, the runtime checks the newly mapped memory cannot be both writable and executable. A similar restriction is placed on the mprotect system call.

From a developer's perspective, it is cumbersome to port applications to run in MCFI's runtime, because the runtime only provides syscall-like APIs. Therefore, embodiments of the invention ported a standard C library called MUSL (available at http://www.musl.org; MUSL libc is a standard C library implementation) by changing its system-call invocations to MCFI runtime API invocations. The MUSL libc, which is also created as a module using the MCFI framework, is instrumented in the same way as other program modules. MUSL has about 64K lines of C code. Applicant's analysis tool reports 45 C1 violations, in which 5 violations are K1 and the other 40 violations are K2. All 5 K1 violations break the code and need to be fixed by the same approach of function wrappers or type adjustments, as discussed before.

MCFI's static linker is modified from Linux's standard linker (ld). MCFI's dynamic linker, modified from MUSL's linker, loads libraries at runtime as discussed herein.

Evaluation

Using its toolchain, Applicant evaluated MCFI on its performance overhead, the CFG generation process, and security. The evaluation was performed on SPECCPU2006 C benchmarks (with slight modifications as discussed before), including nine integer benchmarks and three floating-point benchmarks. All benchmarks were compiled at optimization level three. The experiments were conducted on a system with the x86-64 UBUNTU® 13.10 operating system, an INTEL CORE® i7-3770 CPU at 3.8 GHz, and 8 GB physical memory.

Overhead

MCFI slows down a program's execution. The slowdown is caused by two factors. First, since the program is statically instrumented, the extra checks and no-ops (for alignment) inserted in the program increase its execution time. Second, when the program dynamically loads a library, MCFI's runtime generates a new CFG and updates the ID tables using an update transaction. During an update transaction, check transactions running in parallel cannot finish until the relevant IDs are updated to the new version. Both the CFG generation process and the delay on check transactions increase the execution time.

Execution Overhead Due to Code Instrumentation

Figure 7:
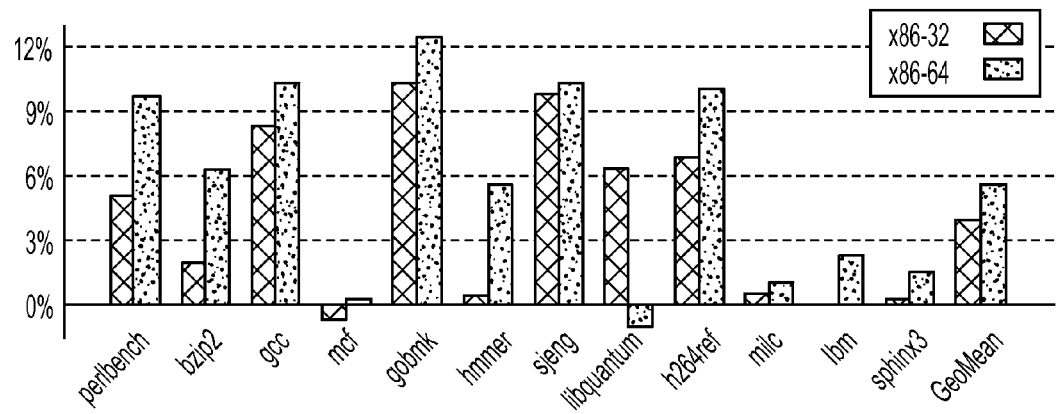
FIG. 7 depicts MCFI overhead on SPECCPU2006 C benchmarks for an embodiment of the invention. No update transaction was concurrently running during this test.

Applicant measured how much execution time overhead MCFI imposes on benchmarks due to code instrumentation. All benchmarks were instrumented and tested on reference data sets three times with a maximum variance of 1.5%. FIG. 7 presents the percentage of execution time increase for the benchmark programs. In this experiment, libraries are statically linked. Therefore, ID tables are not updated during program execution. Consequently, check transactions are not running in parallel with update transactions.

The table shows that the average overhead is around 4-6% on x86-32 and x86-64. It includes the overhead of executing check transactions and sandboxing memory writes. The overhead is comparable to other CFI systems that report about 5.9% overhead on x86-32 and 8.0% on x86-64 without supporting separate compilation is supported and coarse-grained CFI systems such as CCFIR, binCFI, NaCl, and MIP that impose about 5% overhead, but do not support fine-grained CFGs.

The low overhead of MCFI's instrumentation seems surprising considering that a check transaction has two memory reads for reading branch and target IDs. However, the two reads are executed in parallel by the CPU because there is no mutual dependency as confirmed by the micro-benchmarks described herein.

Execution Overhead Due to Code Updates

As mentioned, in the previous experiment, there is no parallel check and update transactions. It is rather difficult to design experiments with parallel check and update transactions for SPECCPU2006 benchmark programs because they load DLLs at the beginning of execution and do not use dlopen to load libraries. Programs exist that dynamically load libraries in the middle of execution using dlopen. For example, a JAVA® Virtual Machine (JVM) dynamically loads and unloads libraries according to what JAVA® classes are running. However, Applicant believes the performance overhead imposed on those systems would be similar to FIG. 3 because library loading is a rare event. A rather extreme test for whether MCFI's transactions scale in a parallel environment is in a Just-In-Time (JIT) compilation environment, where code is generated and installed on-the-fly, and as a result, ID tables need to be updated frequently.

Figure 8:
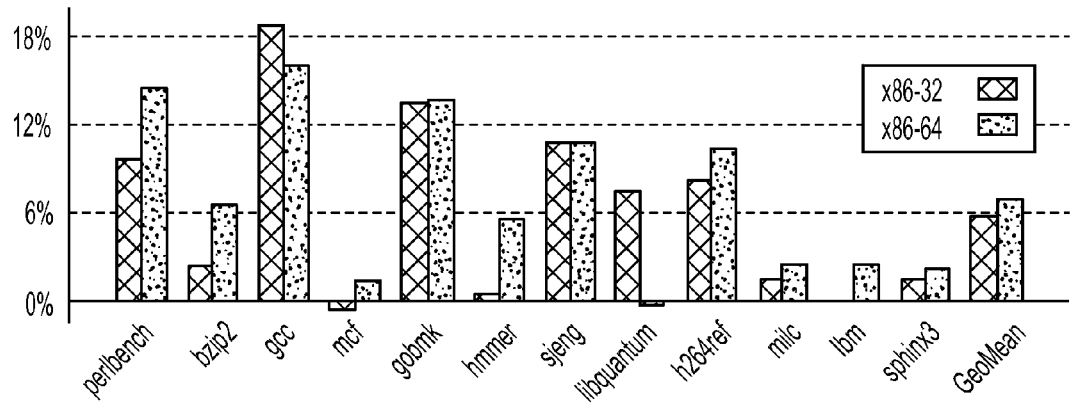
FIG. 8 depicts MCFI overhead on SPECCPU2006 C benchmarks for an embodiment of the invention. Update transactions are executed at the frequency of 50 Hz.

Applicant designed a simulation experiment to test how MCFI's transactions scale. Specifically, Applicant added a separate ID-table update thread when running SPEC-CPU2006 benchmarks. The thread simulates frequent ID-table updates. At a fixed interval, it performs an update transaction that updates the version numbers of all IDs in the ID tables (but preserving the ECNs). As a result, parallel check transactions are delayed. To determine the frequency of update transactions, Applicant measured how frequently new code is installed in the GOOGLE® V8 JavaScript JIT execution engine. Based on that data, Applicant set the frequency to be 50 Hz. FIG. 8 presents the percentage of execution-time increase for the benchmarks. The average overhead is 6-7%, which demonstrates MCFI's transactions scale well with frequent code updates.

Space Overhead

On average, MCFI increases the static code size by 17% on the benchmarks. During runtime it also requires extra memory as large as the code region to store the Bary and Tary tables. However, memory footprint increase is negligible because the majority of a program's runtime memory is occupied by its runtime data in the heap, which is much larger than the code region.

Evaluating MCFI's Transaction Algorithm

MCFI uses its custom transaction implementation. Using micro-benchmarks, Applicant compared MCFI's transaction algorithm with other possibilities. Table 3 shows the micro-benchmark result of normalized execution time of check transactions implemented by TML and described in Dalessandro, Readers-Writer-Lock (RWL) (http://www.cs-.rochester.edu/research/synchronization/pseudocode/rw.html), or a mutex implemented by atomic Compare-And-Swap. TML, the most performant STM under read-dominated workload, doubles the execution time of MCFI, because it needs to read the global sequence lock before and after ID reads. RWL and Mutex, which use expensive LOCK-prefixed instructions, are much slower than MCFI's transactions.

TABLE 3

|  | MCFI | TML | RWL | Mutex |
| --- | --- | --- | --- | --- |
| Normalized Exec Time | 1 | 2 | 29 | 22 |

CFG Generation

Applicant measured the precision of the CFGs generated by MCFI. Table 4 lists the relevant statistics of benchmarks when they are statically linked with libc. For a benchmark, the "IBs" column lists the number of instrumented indirect branches. The number of indirect branches is also the upper bound of possible equivalence classes of addresses in a CFG because an indirect branch is allowed to target all addresses in an equivalence class. The "IBTs" column lists the number of possible indirect branch targets (i.e., functions whose addresses are taken and addresses following a call instruction). The "EQCs" column lists the number of equivalence classes of addresses in the benchmark's generated CFG using the typematching approach. On x86-64, fewer equivalence classes are generated, mainly because more tail calls are replaced with jumps by LLVM's tail call optimization.

TABLE 4

| CFG statistics for SPECCPU2006 benchmarks | | | | | | |
| --- | --- | --- | --- | --- | --- | --- |
|  | x-86-32 | | | x-86-32 | | |
| SPEC 2006 | IBs | IBTs | EQCs | IBs | IBTs | EQCs |
| perlbench | 2250 | 15492 | 930 | 2081 | 15273 | 737 |
| bzip2 | 220 | 515 | 110 | 217 | 544 | 93 |
| gcc | 5215 | 48634 | 2779 | 4796 | 46943 | 1991 |
| mef | 170 | 468 | 119 | 174 | 445 | 106 |
| gobmk | 2734 | 11073 | 709 | 2487 | 10667 | 579 |
| hmmer | 726 | 4464 | 401 | 715 | 4369 | 353 |
| sjeng | 305 | 1457 | 207 | 337 | 1435 | 184 |
| libquantum | 246 | 754 | 161 | 258 | 702 | 121 |
| h264ref | 1099 | 3677 | 493 | 1096 | 3604 | 432 |
| milc | 441 | 2443 | 312 | 432 | 2356 | 264 |
| lbm | 161 | 455 | 112 | 161 | 426 | 96 |
| sphinx3 | 585 | 2963 | 380 | 598 | 2895 | 321 |

Compared to coarse-grained CFI techniques with several equivalence classes supported, MCFI's CFGs can generate two to three orders of magnitude more equivalence classes. For instance, CCFIR and binCFI allow an indirect call to target any function whose address is taken; therefore all such functions are included in one equivalence class. CCFIR and binCFI also allow any return instruction to target any instruction following a call, combining all return sites in one equivalence class. The classic CFI's instrumentation described in Abadi can support a fine-grained CFG, but for implementation convenience, its CFG generation also allows all indirect calls to target any function whose address is taken. NaCl and MIP enforce chunk-based CFI in which an indirect branch can target any chunk beginning; it enforces even less-precise CFGs.

Security

In an MCFI-hardened program, an indirect call targets only typematched function entries and a return can jump to those return sites according to the generated call graph. Therefore, return-into-libc attacks are mitigated because attackers cannot redirect returns and function calls to arbitrary functions. In addition, since MCFI guarantees that only instructions appearing in the CFG are executed, a ROP (return-oriented programming) gadget starting in the middle of an instruction is eliminated. Applicant measured gadget elimination by counting unique gadgets in the original benchmarks and MCFI-hardened ones using a ROP-gadget finding tool called rp++ (https://github.com/0vercl0k/rp). On average, MCFI can eliminate 96.93%/95.75% of ROP gadgets on x86-32/64.

To compare with other CFI techniques, Applicant also calculated the Average Indirect-target Reduction (AIR) metric described in M. Zhang & R. Sekar, "Control flow integrity for COTS binaries" in 22nd Usenix Security Symposium 337-52 (2013) for the twelve SPECCPU2006 benchmarks. Intuitively, the AIR metric, which is a real number in [0, 1), measures how many indirect-branch targets are reduced on average by a CFI technique. A program without any CFI protection has an AIR value of 0 as an indirect branch can jump to any code address in the program. A CFI protection restricts indirect branches to a subset of code addresses. The more restriction a CFI technique places on indirect branches, the closer the AIR metric gets to 1. The AIR values of different CFI approaches are summarized in Table 5.

TABLE 5

|  | MCFI (32) | MCFI (64) | Classic CFI | binCFI | NaCl |
| --- | --- | --- | --- | --- | --- |
| AIR (%) | 99.99 | 99.97 | 99.16 | 98.91 | 96.15 |

The AIR values of MCFI on both x86-32 and x86-64 are computed while other values are derived from the data reported in Zhang & Sekar. Since CCFIR and MIP are capable of enforcing the same protection as binCFI, but weaker than the classic CFI, their AIR values should be between binCFI and the classic CFI. In comparison, MCFI produces the best AIR values.

AIR values aside, there are more evidence that suggests fine-grained CFI provides better protection than coarse-grained CFI. First, ROP attacks can still be launched for systems hardened with coarse-grained CFI. Second, some attacks hijack a function pointer and use that function pointer to jump to a dangerous library function such as execve. These kind of attacks may still be possible under coarse-grained CFI, but not fine-grained CFI. For instance, under coarse-grained CFI, the vulnerability, CVE-2006-6235, of GnuPG allows a remote attacker to control a function pointer and jump to execve, whose address is taken when GnuPG is linked with the MUSL libc. If protected by MCFI, the function pointer cannot be used to jump to execve because their types do not match.

Application to Just-In-Time Systems

Programming languages with managed runtime systems are becoming increasingly popular during the last two decades. Such languages include JavaScript, Java, C#, Python, PHP, and Lua. The use of managed languages is in general beneficial to software security. Managed environments provide a natural place to deploy a range of security mechanisms to constrain untrusted code execution. For instance, Java and .NET virtual machines implement security sandboxes and bytecode verification. As another example, a JavaScript engine enforces dynamic typing, making execution of JavaScript much more secure than native-code-based ActiveX.

For performance, modern managed language implementations adopt Just-In-Time (JIT) compilation. Instead of performing pure interpretation, a JIT compiler dynamically compiles programs into native code and performs optimization on the fly based on information collected through runtime profiling. JIT compilation in managed languages is the key to high performance, which is often the only metric when comparing JIT engines, as seen in the case of JavaScript. Hereafter, the terms "JITted code" refers to native code that is dynamically generated by a JIT compiler and "code heap" refers to memory pages that hold JITted code.

In terms of security, JIT brings its own set of challenges. First, a JIT compiler is large and usually written in C/C++, which lacks memory safety. It contains sophisticated components such as a parser that parses untrusted input programs, an optimizing compiler that generates optimized native code, and a garbage collector. There are always security-critical bugs in such a large and complicated C/C++ code base. For instance, several buffer-overflow vulnerabilities have been found in the GOOGLE® V8 JavaScript engine.

Second, the code heap used in JIT compilation is often made both writable and executable to facilitate online code modification, which is used in crucial optimization techniques such as inline caching and on-stack replacement. Consequently, Data Execution Prevention (DEP) cannot be applied to memory pages of the code heap. By exploiting a bug such as a heap overflow, an attacker can inject and execute new code in those pages.

Finally, even without code injection, a class of attacks called JIT spraying enables an attacker to craft input programs with special embedded constants, influence a JIT compiler to generate native code with those constants embedded, and hijack the control flow to execute those constants as malicious code.

Existing techniques to secure JIT code suffer from two main drawbacks. First, existing systems provide only loose security. NaCl-JIT enforces coarse-grained control-flow integrity, which cannot prevent advanced Return-Oriented Programming (ROP) attacks. Software diversification techniques improve security in a probabilistic sense; however, a lucky or determined attacker might be able to defeat such schemes. Second, some systems impose a large performance overhead. For instance, NaCl-JIT imposes around 51% overhead on the V8 JavaScript x86-64 engine.

Embodiments of the invention provide an approach entitled RockJIT for securing JIT compilation. The premise is to enforce fine-grained Control-Flow Integrity (CFI), in which a high-precision Control-Flow Graph (CFG) is statically extracted from the source code of a JIT compiler and enforced during runtime. As discussed herein, fine-grained CFI is stronger and is an effective defense against control-flow hijacking attacks, including code injection, return-to-libc, and ROP attacks.

Enforcing fine-grained CFI on a JIT compiler is not enough, however, because it dynamically generates new code, whose CFG also needs to be considered. RockJIT is built upon Modular Control-Flow Integrity as discussed herein. In MCFI, a program is divided into multiple modules, each of which carries its own CFG. When modules are linked dynamically, individual CFGs are combined to form the CFG of the combined module. During runtime, CFGs are represented as tables, which are accessed and updated through lightweight software transactional memory. The support for modularity is necessary for a JIT environment because each piece of newly generated code is essentially a new module, whose CFG needs to be combined with the CFG of existing code.

MCFI was designed to support dynamic linking of libraries. Dynamic linking happens infrequently during program execution. A JIT compiler, however, generates and updates code frequently. For instance, the V8 JavaScript engine installs new code about 50 times per second. Additionally, most JIT compilers have a large body of C++ code. The C++ language contains advanced control flow features such as exceptions and virtual methods, which complicate the process of CFG generation.

RockJIT addresses the aforementioned challenges and is a general JIT compilation hardening approach.

Embodiments of the invention harden both the JIT compiler and JITted code, but by enforcing different levels of CFG precision on the JIT compiler and JITted code, its overhead is much smaller than previous work and its security is stronger. Evaluation on the V8 engine shows that RockJIT-hardened V8 can remove over 99.97% functionality-irrelevant indirect branch edges from NaCl-JIT-hardened V8, and is only 14.6% slower than the vanilla V8.

Embodiments of the invention also provide a method for generating high-precision CFGs for C++ programs. Extensive experience on over one million lines of code demonstrates that the methods described herein are practical: C++ programs can be made compatible with the methods with a small amount of changes to source code.

Evaluation on the V8 engine shows that the methods described herein for JIT protection requires only minimal changes to a JIT compiler. Applicant changed only around 800 lines of source code, about 0.14% of V8's code base. Applicant believes that the methods described herein can be easily adopted to other JIT compilers.

RockJIT Overview

This section discusses RockJIT's threat model, its main defense mechanisms, and its security strength.

Threat Model

RockJIT's threat model is the same as the strong model in Abadi's original CFI work. An attacker is modeled as a concurrent user-level thread, running in parallel with other threads in the JIT compiler. The attacker thread can read and write any memory, subject to memory page protection. Therefore, in this model, any writable memory can change because of the attacker thread between any two instructions in the user program. CPU registers of a thread are assumed not writable directly by the attacker thread. However, the attacker can indirectly affect registers of other threads by corrupting memory. For example, if one JIT-compiler thread loads from writable memory to a register, then the register's value is controlled by the attacker because the attacker controls the writable memory.

It is further assumed that the JIT compiler's code is benign, but may contain vulnerabilities. The JITed code can contain malicious logic because it is compiled from source code that might be provided by the attacker. The malicious logic aims to launch attacks such as code injection and JIT spraying attacks.

Figure 9:
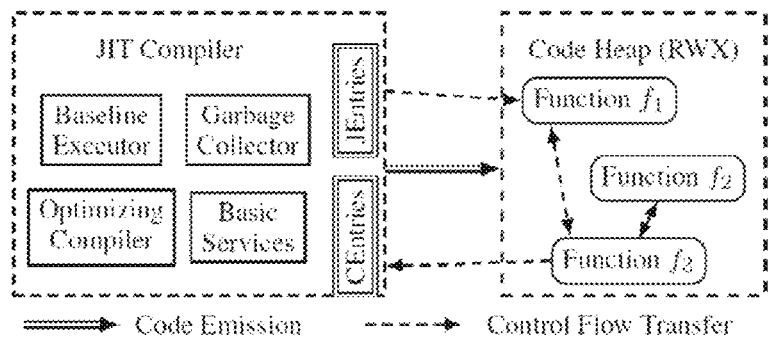
FIG. 9 depicts the architecture of modern JIT compilers.

Two further assumptions are made about the JIT compiler. First, assume context switches between the JIT compiler and JITted code are through a set of interfaces; that is, only through one of those JEntries and CEntries in FIG. 9 can the control transfer between the JIT compiler and JITted code. This assumption enables different CFG precision on the JIT compiler and JITted code. Second, assume JITted code, when executed normally (i.e., no jumps to the middle of instructions), does not contain direct system-call invocations and privileged instructions. The JITted code can, however, invoke one of the CEntries to request services such as OS system calls from the JIT compiler (after appropriate security checking by the compiler). These two assumptions are true in all the JIT compilers Applicant inspected. Even if a certain JIT compiler violates these assumptions, it should be easy to modify it to make the assumptions hold.

Defenses in RockJIT

Figure 10:
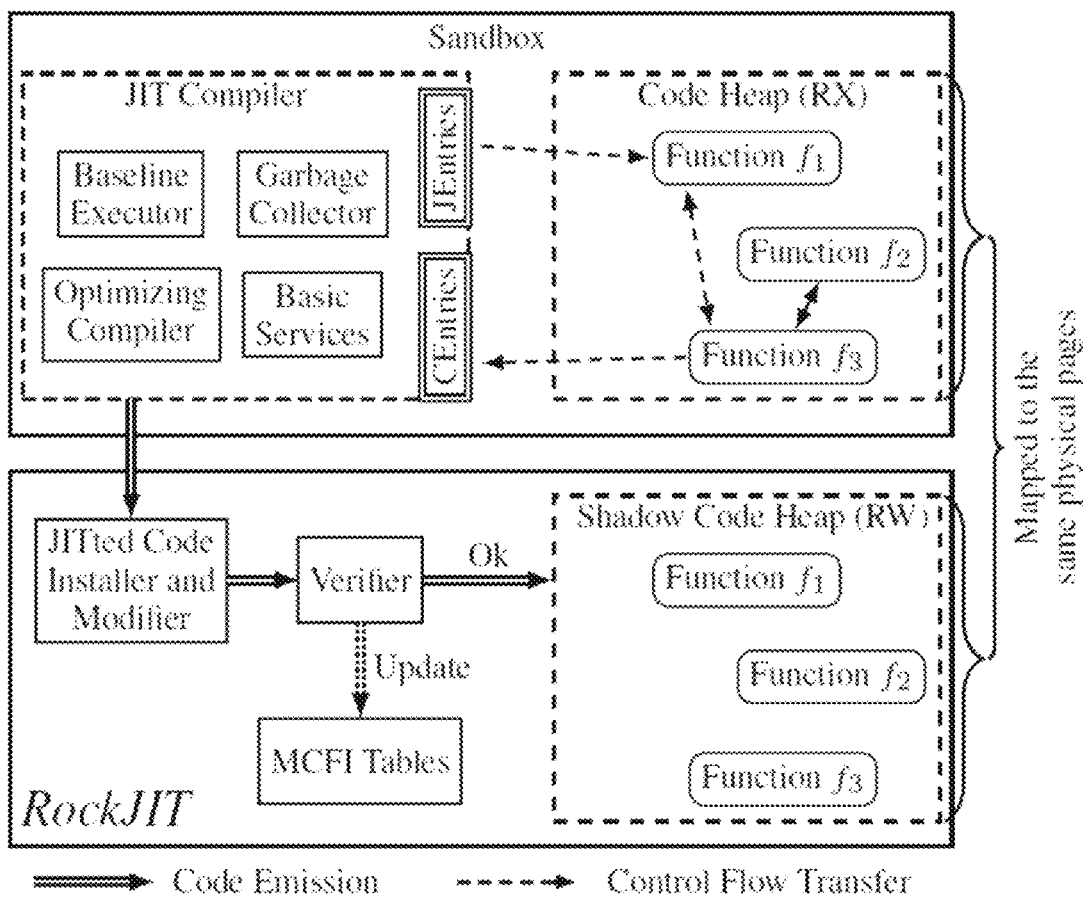
FIG. 10 depicts the architecture of the RockJIT system according to embodiment of the invention.

RockJIT's architecture is visualized in FIG. 10. It provides services to a JIT compiler and monitors its security. An existing JIT compiler such as V8 is modified slightly to cooperate with Rock-JIT. It is then compiled and instrumented by RockJIT's compilation toolchain to generate an MCFI module. The module is loaded by RockJIT into a sandbox. After loading, RockJIT generates a control-flow graph for the JIT compiler based on the auxiliary type information in the module, constructs MCFI tables that encode the control-flow graph, and starts execution of the JIT compiler.

The sandbox around the JIT compiler and JITted code restricts their control flow according to the tables and also restricts their memory access to be inside the sandbox. The JIT compiler can request services provided by RockJIT via a set of well-defined interface functions. For example, to prevent code in the sandbox from changing memory protection arbitrarily, all direct system calls for changing memory mapping and memory pages' protection bits are forbidden; instead, the code can invoke services provided by RockJIT to issue such system calls in a managed way.

To rule out code injection attacks, RockJIT guarantees that no memory pages are writable and executable at the same time, similar to Data Execution Protection (DEP). One challenge is that the code heap (i.e., memory pages that hold JITted code) is made both writable and executable in typical JIT compilers.

To address this issue, RockJIT uses a shadow code heap. It takes advantage of the virtual memory mechanism available to user-space programs. The shadow code heap is outside of the JIT compiler's sandbox and in Rock-JIT's private memory. It is mapped to the same physical pages as the code heap in the sandbox but with different permissions. This can be achieved by shared memory mechanisms provided by OSes (e.g., shm_open, ftruncate, and mmap libc calls on Linux). In particular, the code heap in the sandbox is made readable and executable, but not writable. The shadow code heap is made readable and writable, but not executable. (Since the shadow code heap is controlled by trusted RockJIT, whether it is executable or not does not affect security. Embodiments of the invention make it not executable, following the principle of least privilege.) Because memory access of the JIT compiler is restricted to be inside the sandbox, the JIT compiler cannot directly modify the shadow code heap for runtime code manipulation. Instead, it invokes services of RockJIT to install new native code or modify existing native code. RockJIT performs verification on the native code to check a set of properties (discussed in the "Securing JITted Code" section herein) for security. If the verification succeeds, RockJIT installs the new code in the shadow code heap and updates MCFI tables using a new control-flow graph that takes the new code into account. Since the shadow code heap maps to the same physical pages as the in-sandbox code heap, the code heap is filled with the same code, which can then be invoked by the JIT compiler.

RockJIT enforces control-flow integrity on both the JIT compiler and JITted code, but applies different levels of precision on those two parts. For the JIT compiler, RockJIT applies a C++ CFG generation strategy detailed in the "C++ CFG Generation" section herein to produce a relatively fine-grained CFG offline; it takes into consideration C++ semantics such as virtual method calls. In contrast, the CFG for JITted code is coarse-grained in the sense that all its indirect branches share a common set of targets. The JIT compiler is modified to emit not only native code, but also information about indirect-branch targets. The verifier then deduces the coarse-grained CFG for the new code and combines it with the old CFG.

The approach of hybrid CFI precision in RockJIT is the result of a careful consideration of both security and performance. First, the JIT compiler's code is mostly where the majority of the code is and contains dangerous system call invocations. Because its code is statically available, constructing a fine-grained CFG offline for the JIT compiler increases security substantially as recent work has shown that coarse-grained CFI can still be attacked by ROP attacks. On the other hand, JITted code is frequently generated on the fly and for performance it is important that verification and new CFG generation do not have high performance overhead. Verification and CFG-generation algorithms for coarse-grained CFI run much faster. Applicant believes that coarse-grained CFI for JITted code will not jeopardize security because one of the assumption that JITted code cannot contain dangerous instructions such as system calls, a property that is enforced by RockJIT's verifier; such instructions are required in an attack. JITted code can still request system-call services from the JIT compiler, but the JIT compiler is hardened through fine-grained CFI. Security is maintained as long as sufficient checks are placed before system calls for the set of control-flow paths in a fine-grained CFG, which is a much smaller set than the one in a coarse-grained CFG.

Security Benefits

Despite the threats described in the threat model, Rock-JIT's defense provides the following security benefits.

First, JIT spraying attacks are prevented. JIT spraying attacks inject malicious instruction sequences in seemingly benign JITted code and jump to the malicious code by hijacking the control-flow. RockJIT enforces control-flow integrity and it is not possible to execute instructions that are not in the original JITted code. Therefore, JIT spraying attacks are prevented.

Second, the execution of the JIT compiler respects a fine-grained CFG and there are no known ROP attacks that can attack a system with fine-grained CFI. Furthermore, no memory pages in the JIT compiler and JITted code are both writable and executable, preventing code injection attacks. Thanks to the verifier, the JIT compiler is not in the TCB even though it performs runtime code manipulation. The native code generated by the JIT compiler is first checked to obey a set of safety properties before installed. The verifier is in the TCB but it is much smaller than the JIT compiler.

Securing Jitted Code

The code heap maintained by a JIT compiler is where code is dynamically managed. It consists of multiple code regions. A JIT compiler dynamically installs, deletes, and modifies code regions. New code regions are frequently generated by the compiler and installed in the code heap. When a code region is no longer needed, the JIT compiler can delete it from the code heap and reuse its memory for future code installation. Runtime code modification is mostly used in performance-critical optimizations. As an example, inline caching is a technique that is used in JIT compilers to speed up access to object properties. In this technique, a JIT compiler modifies native code to embed an object property such as a member offset after the property has been accessed for the first time, avoiding expensive object-property access operations in the future. Another example of runtime code modification occurs in V8 during code optimization. V8 profiles function and loop execution to identify hot functions and loops. It performs optimization on the hot code to generate an optimized version. Afterwards, runtime code patching is performed on the unoptimized code to transfer its control to the optimized version through a process called on-stack replacement.

Because RockJIT enforces CFI, it is necessary to check security for each step of runtime code installation, deletion, and modification. The "Verification" section herein discusses how verification is performed when a new piece of code is installed. The process for code deletion and modification has only small differences, which are discussed in the "JITted Code Installation, Deletion, and Modification" section. The "Modification to a JIT Compiler" section discusses how to modify a JIT compiler to cooperate with RockJIT for secure native code execution using V8 as an example.

Verification

The verifier maintains three sets of addresses that are code addresses in the code heap: pseudo-instruction start addresses (PSA), indirect branch targets (IBT), and direct branch targets (DBT).

The pseudo-instruction start addresses (PSA) address set remembers the start addresses of all pseudo-instructions. A "pseudo-instruction" is defined as: (1) a checked indirect branch, which is MCFI's table-based instruction sequence for checking a register r immediately followed by an indirect branch through r; or (2) a masked memory write, which is MCFI's mask on a register r immediately followed by a memory write through r; or (3) an instruction that is neither an indirect branch nor an indirect memory write.

The indirect branch targets (IBT) address set remembers all possible indirect branch targets. All such targets are four-byte aligned.

The direct branch targets (DBT) address set remembers all direct branch targets.

The critical invariant of the three sets is IBT ∪ DBT ⊆ PSA. That is, all indirect and direct branch targets must be start addresses of pseudo-instructions. With this invariant, it is impossible to jump to the middle of an instruction, which is necessary for JIT spraying attacks. Furthermore, it is impossible to transfer the control to an indirect branch or a memory write without executing its preceded MCFI check, which is necessary for CFI and SFI.

The three address sets are built incrementally with the installation of new code. Initially, they are all empty sets when the code heap contains no code. When a new code region is installed, the verifier updates the three address sets; that is, compute PSA, IBT, and DBT after taking new code into consideration. This approach for computing these new sets utilizes a combination of information already in the code and meta information emitted by a modified JIT compiler. For instance, direct branch targets (DBT) can be computed from the code alone. For PSA, the verifier for V8 takes the start address of the new code and identifies pseudoinstruction boundaries by following a process similar to sequential disassembly (however, no full disassembly is performed; only the boundaries are identified as discussed in the DFA approach herein). This is sufficient for V8. If a JIT compiler mixes code and data in JITted code, then the JIT compiler could be modified to also emit instruction boundary information. For IBT, new indirect branch targets include the start address of the function and the addresses after direct/indirect calls in the function because V8 installs the native code of one function at a time. In addition, there are indirect branch targets related to exception handling and optimization (e.g., on-stack replacement entry points in an optimized function). Applicant modified V8 to emit these additional indirect branch targets along with code.

With the new address sets, the verifier checks that IBT ∪ DBT ⊆ PSA and verifies the following constraints on the new code. Constraint C1 requires that indirect branches and memory-write instructions are appropriately instrumented. In particular, only checked indirect branches and masked memory writes are allowed. Constraint C2 requires that direct branches jump to addresses in DBT. This ensures that the new code respects DBT. Constraint C3 requires that the code contains only instructions that are used for a particular JIT compiler. This set of instructions is usually a small subset of the native instruction set and can be easily derived by inspecting the code-emission logic of a JIT compiler. Importantly, this subset cannot contain system calls and privileged instructions.

Implementation details about a verifier constructed for V8 are provided next. First, the address sets are implemented by bitmaps for fast look-ups and updates. Each bitmap maps a code address to one if and only if that address belongs to the corresponding set, otherwise zero.

Second, the speed of verification is of practical importance. Because V8 performs frequent code installation, a slow verifier can impact the performance nontrivially. For example, NaCl-JIT includes a disassembly-based verifier and it reports 5% overhead for the verification alone. Embodiments of the invention adopt an approach based on Deterministic Finite Automata (DFA). It performs address-set updates and constraint checking in one phase. The verifier incurs only 1.7% overhead for the verification.

In detail, embodiments of the invention use a trie structure to enumerate all possible allowed instruction encoding. Then the trie is converted to a DFA. The DFA has 257 states. It has multiple acceptance states: one for recognizing a checked indirect branch; one for recognizing a masked memory write; one for recognizing a direct branch; one for recognizing all other V8-allowed instructions. The verifier iterates through all instructions recognized by the DFA. When a direct branch is matched, it records its jump target; when a checked indirect branch, a masked memory write, or one allowed instruction is matched, it moves forward. In the above cases, the pseudo-instruction boundaries are also recorded. The verification fails when the DFA reaches a failure state (e.g., due to an illegal instruction). After all code bytes have been matched, the verifier updates the address sets and checks that IBT ∪ DBT ⊆ PSA. When the verification succeeds, constraints C1-C3 are respected by the code.

Recall that the threat model does allow attackers to write arbitrary memory pages in the sandbox that are writable, so it is possible that after the code is emitted in the sandbox and before it is copied outside of the sandbox for verification, the attackers might corrupt it. However, the corrupted code still needs to pass the verification. Once it passes the verification, the security benefits mentioned herein are still valid.

Jitted Code Installation, Deletion, and Modification

In RockJIT, a JIT compiler cannot directly manipulate the code heap, which does not have the writable permission. Instead, RockJIT provides interface functions to the JIT compiler for code installation, deletion, and modification. One worry for runtime code manipulation is thread safety: one thread is manipulating code, while another thread may see partially manipulated code. This section discusses the detailed steps involved in RockJIT's code manipulation and how thread safety is achieved.

For code installation, the JIT compiler invokes RockJIT's code installation service and sends a piece of native code, the target address where the native code should be installed, and meta information about the code for constructing new address sets. The code-installation service then performs the following steps.

First, the verifier performs verification on the code and updates the address sets to PSA, IBT, and DBT.

Second, if the verification succeeds, the code is copied to the shadow code heap at an address computed from the start address where the code should be installed. There is a fixed correspondence between addresses of the code heap in the sandbox and addresses of the shadow code heap.

Third, the runtime tables used by MCFI are updated to take into account the new code. Since coarse-grained CFI is enforced on JITted code, only information in IBT is needed to update the tables.

There are a couple of notes worth mentioning about the above steps. First, the verification of benign programs is expected to succeed if there are no bugs in the JIT compiler. A verification failure indicates a bug that should be fixed. Second, it is important that the MCFI tables are updated after copying the code, not before. During the copying process, the code becomes partially visible to the JIT compiler as the code heap is mapped to the same physical pages as the shadow code heap. However, since the MCFI tables have not been updated yet, no branches can jump to the new code, avoiding the situation in which one thread is installing some new code and another thread branches to partially installed code.

In a multi-threaded JIT compiler, one thread may request the deletion of a code region, while another thread may be executing in the middle of that code region due to JIT compiler bugs or attacks. For safety, the code region shall not be deleted until all threads exit the code region. The following steps are performed when one thread invokes the code-deletion service to delete code region cr.

First, check that direct branches outside cr do not target any instruction in cr. If this check fails, deleting cr would break the critical invariant mentioned before; this would imply either a bug in the JIT compiler or an attack and therefore RockJIT simply terminates the JIT compiler in this case.

Second, remove cr-related entries in the MCFI tables to prevent all indirect branches from targeting cr. After this step, no thread can enter cr simply because no direct or indirect branch in the JITted code can target cr.

Third, check that there are no threads running (or sleeping) in cr. To achieve this, RockJIT waits until it observes that each thread has entered the code in RockJIT's runtime at least once after the update to the MCFI tables. Once a thread enters the code in RockJIT's runtime, it can no longer execute instructions in cr thanks to the update to the MCFI tables.

In detail, RockJIT maintains a local counter for each thread. The counter for a thread is atomically incremented by one each time when the thread enters the code in RockJIT's runtime. When handling a code-deletion request, RockJIT atomically reads all threads' counters, associates them with cr, and returns without removing cr. At a later time (e.g., in the next invocation of code deletion), RockJIT checks that each thread's current counter value is not equal to the thread's old counter value associated with cr. If the condition holds, it means that after the code deletion request, each thread has executed RockJIT's code at least once and therefore no thread can possibly run code in cr; so it can be safely deleted.

Compared to NaCl-JIT, which supports only a finite number of code deletion operations, the code deletion approach provided herein supports an arbitrary number of code deletion operations. Modern JIT engines implement mechanisms to interrupt JITted code execution (e.g., V8 inserts extra code to each function's prologue and each loop to interrupt the execution to support optimization and deoptimization). Therefore, even if the JITted code is running in a loop, its execution can be interrupted.

For code modification, if the new code region has the same internal pseudo-instruction boundaries and native instruction boundaries as the old code region and the new code passes verification, RockJIT follows NaCl-JIT's approach to replace the old code with the new code. Otherwise, code modification is implemented as a code deletion followed by a code installation.

Modification to a JIT Compiler

An existing JIT compiler needs to be modified to work with RockJIT. This section discusses Applicant's adaptation of the GOOGLE® V8 JavaScript engine (v3.25.28.3). To adapt V8's x86-64 source, Applicant modified only 811 lines of its source code. 801 lines were changed to make it generate MCFI-compatible code and invoke RockJIT's services for runtime code manipulation. 10 lines were added for CFG generation, which will be discussed in the next section. This experience partly demonstrates that modifying an existing JIT compiler to work with RockJIT requires only modest effort. Most of the changes to V8 were in its code-emission logic to make the generated code compatible with MCFI.

Code-emission functions that generate indirect branches were modified to generate checked indirect branches. A checked indirect branch in MCFI requires two scratch registers to hold intermediate values. Since V8 reserves r10 for its internal use, r10 is used as one scratch register. In addition, V8 reserves r12 to always hold a constant representing integer one. Embodiments of the invention use r12 as the second scratch register and restore its constant value after a checked indirect branch.

Code-emission functions for indirect memory writes were modified to generate masked memory writes. The sandbox resides in the [0, 4 GB) memory. Therefore, an indirect memory write is turned into two instructions: the first loads the target address into a scratch register r and clears the upper 32 bits; the second writes data to the address in r.

Code-emission functions for procedure calls were modified to align the addresses immediately following the calls to four-byte aligned addresses. All indirect branch targets need to be four-byte aligned to allow atomic table access. The address alignment is achieved by inserting multi-byte no-op instructions before call instructions.

The V8 software was also modified to accommodate online code patching. When V8 emits certain optimized native code, it reserves some bytes in the code in anticipation of future code patching (for a process called deoptimization). The original V8 software reserves 13 bytes for such purpose. RockJIT needs more bytes because of extra MCFI checks; 44 bytes are reserved instead. Finally, changes were made to V8 to invoke code installation, deletion, and modification services provided by RockJIT at appropriate places.

RockJIT changes much less code than NaCl-JIT, which changed over 5,000 lines of code for the x86-64 version of V8. NaCl-JIT requires more changes because: (1) it disallows the mix of code and data in V8's code and V8 has to be changed to separate code and data; RockJIT's CFI allows the mix of code and data as long as data cannot be reached from code in control flow; (2) NaCl-JIT uses the ILP32 programming model on x86-64, while the native V8 uses LP64 model; therefore, it has to change nearly the entire code-emission logic.

C++ CFG Generation

RockJIT secures a JIT compiler's code by enforcing fine-grained CFI. A general methodology for generating fine-grained CFGs from C/C++ programs was needed because all JIT compilers are developed in C/C++ for performance. The MCFI work presents such a method for C programs, but not C++ programs.

In CFI, a binary-level CFG is enforced. In such a CFG, nodes represent machine instructions and there is a directed edge between two instructions if the control can possibly reach the second instruction after the execution of the first. The edges out of non-indirect-branch instructions can be statically computed. The difficulty concerns indirect branches. However, embodiments of the invention can statically compute a superset of their possible targets for approximation. In a C++ program, indirect branches are compiled from code that uses features such as virtual method calls and exceptions. This section discusses those C++ features and how RockJIT approximates the resulting indirect branches' targets by static analysis. It should be noted that C++ compilation is ABI-dependent, and the CFG generation described herein targets binaries conforming to the mainstream Itanium C++ ABI (http://mentorembedded.github.io/cxx-abi/abi.html) supported by LLVM and GCC. The approach has been tested using a modified LLVM compiler (version 3.3).

Virtual Method Calls

C++ supports multiple inheritance and virtual methods. A virtual method call through an object is compiled to an indirect call (or an indirect jump with tail call optimization). A virtual call on an object is resolved during runtime through dynamic dispatch. Which method it invokes depends on the actual class of the object. RockJIT performs CHA on C++ code. This analysis tracks the class hierarchy of a C++ program and determines, for each class C and each virtual method of C, the set of methods that can be invoked when calling the virtual method through an object of class C; these methods might be defined in C's subclasses. RockJIT allows a virtual method call to target all methods determined by the CHA analysis. CHA is usually a whole-program analysis. To support separate compilation, embodiments of the invention emit a class hierarchy for each module and combines modules' class hierarchies at link time.

Function Pointers

C++ supports two kinds of function pointers: (1) those that point to global functions or static member methods; and (2) those that point to non-static member methods. Function pointers in these two kinds have different static types. Their target sets are disjoint and they are handled differently by compilers. Appendix C shows a code example about the two kinds of function pointers. Function pointer fp is of the first kind. It is assigned to the address of a global function getpagesize at line 2. At line 3, the function pointer is invoked via an indirect call (or indirect jump if it is a tail call). To identify its targets, RockJIT adopts a typematching method that is similar to our previous MCFI work: an indirect branch via a function pointer of type $\tau^*$ can target any global function or static member method whose static type is equivalent to $\tau$ and whose address is taken in the code.

Function pointer memfp at line 7 is of the second kind. The code assumes Pigeon is a subclass of Animal. According to the C++ semantics, embodiments of the invention allow an indirect branch through such a function pointer of type $\tau^*$ to target any member method defined in the same class whose type is equivalent to $\tau$ and whose address is taken. Further, for each matched virtual member method, embodiments of the invention search the class hierarchy to find in derived classes all virtual methods whose types match and add those functions to the target set.

Exception Handling

This second first discusses how C++ exceptions are handled by LLVM that implements the Itanium C++ ABI. In this ABI, C++ exception handling is a joint work of the compiler, a C++-specific exception handling library such as libc++abi and a C++-agnostic stack-unwinding library such as libunwind.

Figure 11:
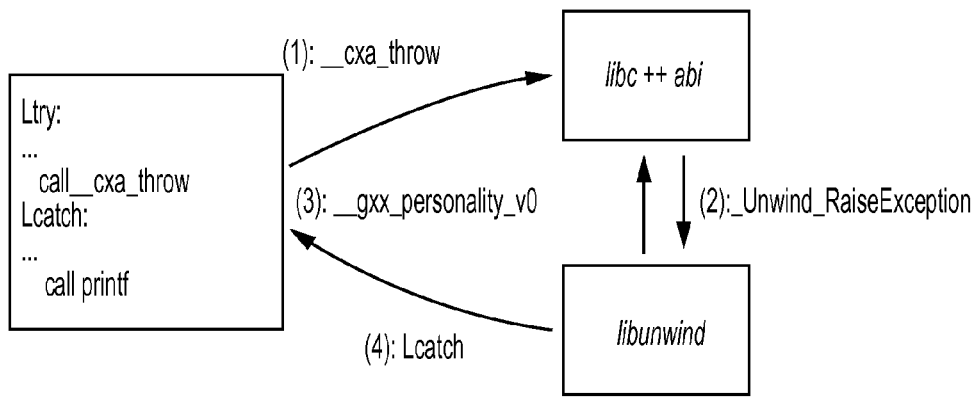
FIG. 11 depicts control transfers during C++ table-based exception handling according to an embodiment of the invention.

When a compiler compiles a C++ program, it emits sufficient information for stack unwinding, since every stack frame needs to be searched to find a matching catch clause for a thrown exception object. Such data is emitted as metadata (e.g., the eh_frame and gcc_except_table sections in an ELF file) during compilation. FIG. 11 depicts the runtime control flow when an exception object is thrown. It assumes libc++abi and libunwind are used; the control flow would be the same when other libraries are used as long as they obey the Itanium C++ ABI.

The left box in FIG. 11 shows some assembly code in which the Ltry label starts a C++ try statement and Lcatch implements a catch statement. A C++ throw statement is translated to a direct call to libc++abi's _cxa_throw, which takes three arguments: the heap-allocated exception object, its type information, and destructor. It performs initialization and invokes _Unwind_-RaiseException in libunwind, which extracts the code address where the exception is thrown and walks through each stack frame by consulting the eh_frame section. In each stack frame, _Unwind_RaiseException uses an indirect call to invoke a C++-specific routine called _gxx-_personality_v0. It is defined in libc++abi and searches for catch clauses in that frame by consulting gcc_except_table. Two cases can happen. If a type-matching catch clause is found in the current frame, then control is transferred to the catch clause via an indirect branch, called CatchBranch. If a type-matching catch is not found, the stack unwinding should be resumed. However, if there is a clean-up routine that is used to deallocate objects allocated in try statements, then the clean-up routine needs to execute before the unwinding continues. It turns out that the same indirect branch (CatchBranch) is used to transfer the control to the clean-up routine, but with a different target address.

All control-flow edges in FIG. 11, except for the edges out of CatchBranch, can be handled using the strategies discussed herein (CHA analysis and the type-matching method). For the CatchBranch, the implementation connects it to all catch clauses and cleanup routines. To support separate compilation, RockJIT's modified LLVM compiler emits a table recording addresses of all catch clauses and cleanup routines in each module, and these tables are combined during linking.

If an exception object is caught, but not rethrown, libc++abi also invokes the object's destructor, which is registered when calling _cxa_throw. The invocation is through an indirect call. Possible targets of this call in a module can be statically computed by tracking _cxa_throw invocations. As a result, RockJIT's C++ compiler also remembers these target addresses for each module and combines them at link time.

Global Constructors and Destructors

The constructors of global and local static objects' are invoked before the main function of a C++ program, and their destructors are called after the main function returns. LLVM handles such cases by generating stub code for each such object. The stub code directly invokes the constructor and registers the destructor using either _cxa_atexit or atexit defined in libc. The addresses of the stub code are arranged in the binary and iterated through by an indirect call (called CtorCall) in libc before main. After main, another libc indirect call (called DtorCall) iterates through the registered destructors to destroy objects. Both CtorCall and DtorCall's targets are statically computable by analyzing the compiler-generated stub code.

Other Control-Flow Features

Return instructions are handled in the same way as MCFI. By analyzing the targets of call instructions, embodiments of the invention first construct a call graph. Then a return instruction in a function can return to any address immediately following a call that can invoke the function according to the call graph.

Switch and indirect goto statements are typically compiled to jump-table based indirect jumps; their targets can be statically extracted from read-only jump tables. These indirect jumps are subject to static verification and do not need instrumentation.

Lambda functions are available in C++11, whose related control-flow edges are also supported by the CFG generation approaches described herein. Compilers automatically convert lambda functions to functors, which are classes with operator( ) methods. Therefore, control-flow edges related to the operator( ) methods in such structures can be approximated using the CFG generation method discussed herein.

Conditions for C++ CFG-Generation Method

The CFG-generation method described herein is largely type based. Indirect calls through a function pointer to a global function is allowed to call any global function whose type matches the function pointer's type. The class hierarchy analysis, which is used to resolve virtual method calls, is also based on static types. As a result, if a C++ program misuses types using features such as arbitrary type casts, then the CFG-generation method may construct a CFG whose edges do not cover all dynamic control flow of the program; enforcement of such a CFG would break the program's execution. On the other hand, Applicant believes that the method will not break a C++ program's execution if the following conditions are met: (1) no type cast to or from function pointer types; (2) no C-style type cast or reinterpret_cast from or to classes with virtual member methods; (3) no inlined assemblies. These conditions are similar to the ones in MCFI's CFG construction for C programs.

Figure 12:
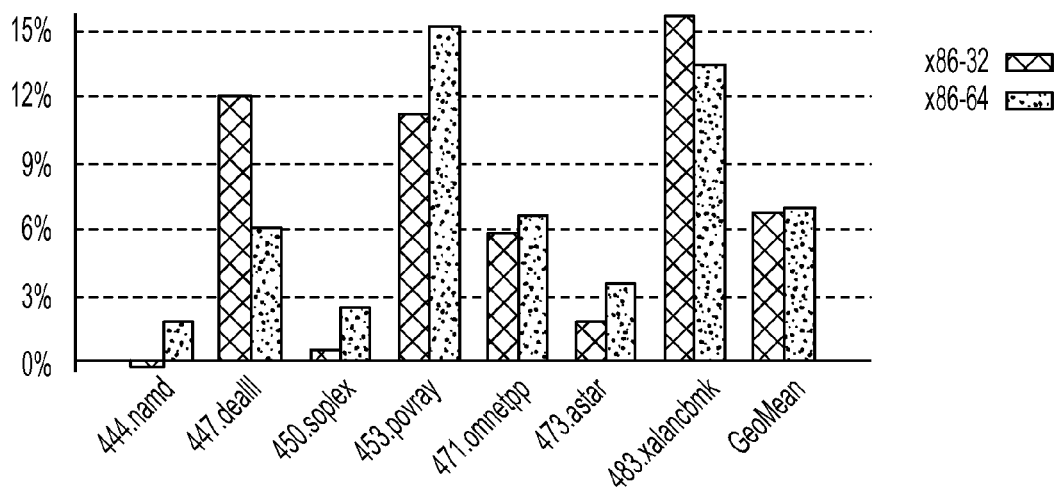
FIG. 12 depicts MCFI's performance overhead on SPEC-CPU2006 C++ benchmarks according to an embodiment of the invention.

Applicant built a static checker to catch violations of the above conditions in C++ programs in LLVM's front-end, Clang. Violations reported by the checker on a C++ program can be straightforwardly fixed to be compatible with the CFG-generation method using the wrapper approach described in the context of MCFI. For V8, which has over 555,000 lines of code, Applicant modified only 10 lines of code using the wrapper approach to make it compatible with the CFG-generation method. Applicant also tried this approach on the seven C++ programs in SPECCPU2006 as well as libc++, libc++abi, and libunwind for a total over 620,000 lines of code, only 35 lines of code (all in SPEC-CPU2006 benchmark 453.povray) need to be changed to generate CFGs using the method described herein. In addition, all of the generated CFGs have been tested on data sets that come with those benchmarks and the results are summarized below and in FIG. 12.

Applicant measured MCFI's performance overhead on SPECCPU2006 C++ benchmarks. The experiments were conducted in the same environment as mentioned in the "Evaluation" section herein. All benchmark programs and their dependent libraries were compiled with the O3 optimization. The results are averaged over three runs and presented in FIG. 12. The x86-32 and x86-64 bars are results of benchmarks compiled with -m32 and -m64 compiler options, respectively. As can be seen, MCFI incurs around 6.8%/15.7% (average/maximum) performance overhead on C++ benchmarks.

CFG Statistics for C++ Programs

Table 6 shows CFG generation statistics for V8 and the C++ benchmarks in SPECCPU2006. They are compiled with the O3 optimization (on V8, tail call optimization is turned off for more equivalence classes of return instructions and yet performance overhead is negligible) and are statically linked with dependent libraries including libc++, libc++abi, libunwind, and MUSL libc. For each program, the table lists its source lines of code (SLOC) and the number of indirect branches (IB). The table also presents statistics for the CFGs generated using RockJIT's CFG-generation method. The column IBT lists the number of indirect-branch targets in the CFGs. It is the number of functions whose addresses are taken, plus the number of return addresses, plus the number of catch clauses and clean-up routines. The column EQC presents the number of equivalence classes of addresses in the CFG. RockJIT follows the original CFI described in Abadi of using equivalence classes: two addresses are equivalent if there is an indirect branch that can jump to both targets according to the CFG. If the target sets of two indirect branches are not disjoint in the CFG, then the two sets are merged into one equivalence class and the two indirect branches are allowed to jump to any target in the equivalence class. This process results in some loss of CFG precision. However, as can be seen from Table 6, V8 still has over 10 k equivalence classes of target addresses (note that EQC is upper bounded by IB). This is much stronger than coarse-grained CFI, which enforces only one or several equivalence classes.

TABLE 1

CFG statistics for V8 and SPECCPU2006 C++ benchmarks

| Program | SLOC | IB | IBT | EQC |
| --- | --- | --- | --- | --- |
| V8 | 555,383 | 34,279 | 100,497 | 10,452 |
| 444.namd | 3,886 | 598 | 4,694 | 287 |
| 447.dealII | 93,384 | 11,426 | 58,930 | 2,529 |

TABLE 1-continued

CFG statistics for V8 and SPECCPU2006 C++ benchmarks

| Program | SLOC | IB | IBT | EQC |
| --- | --- | --- | --- | --- |
| 450.soplex | 28,277 | 4,554 | 17,944 | 1,387 |
| 453.povray | 78,705 | 2,247 | 15,477 | 1,048 |
| 471.omnetpp | 19,991 | 5,672 | 30,781 | 1,494 |
| 473.astar | 4,280 | 544 | 3,813 | 293 |
| 483.xalancbmk | 267,399 | 27,397 | 94,103 | 6,490 |

Evaluation

Applicant evaluated RockJIT's security and performance using the GOOGLE® V8 JavaScript engine. All experiments were conducted on a system with x86-64 Ubuntu 14.04, an INTEL CORE® i7-3770 CPU, and 8 GB physical memory. All programs tested were compiled to 64-bit binaries at optimization level three.

Security Evaluation

By enforcing fine-grained CFI on V8's code, RockJIT improves its security. ROP attacks are restricted in terms of both the available gadgets and how gadgets can be chained to form an attack. To test the first aspect, Applicant used a ROP-gadget finding tool, rp++ (https://github.com/0vercl0k/rp), to find the number of unique gadgets that can be found in the native V8 and RockJIT-hardened V8. In the hardened V8, a potential gadget has to start at a valid indirect branch target (e.g., a return address). Applicant's result shows that RockJIT can eliminate nearly 98.5% gadgets from V8's code base. Applicant also tried the tool on those SPEC C++ benchmarks and RockJIT can eliminate 98.3% gadgets from those benchmarks. A caveat about these data is that they depend on a specific gadget-finding tool. Other tools might use different definitions of gadgets.

Fine-grained CFI further improves security by eliminating many more functionality-irrelevant control-flow edges and therefore restricting how gadgets can be chained. The execution of gadget g can be followed by only those gadgets whose start addresses can be targeted by the indirect branch at the end of g. By contrast, coarse-grained CFI allows gadget g to be followed by all other gadgets (assuming only one equivalence class is enforced). As a concrete comparison, Table 7 lists the number of edges for indirect branches in NaCl-JIT V8's CFG, which enforces coarse-grained CFI, and the number in RockJIT V8's CFG.

TABLE 7

| V8 defenses | NaCl-JTT V8 | RockJIT V8 |
| --- | --- | --- |
| Total # of indirect-branch edges | 7,976,474,777 | 2,051,600 |

Because NaCl-JIT allows an indirect branch to target any 32-byte aligned address, the number of indirect-branch edges for NaCl-JIT V8 is computed by IB*CodeSize/32, where IB is the number of indirect branches in V8 and CodeSize is the size of V8's code. The number for RockJIT V8 is computed by summing the out degrees of indirect-branch nodes in its CFG. RockJIT eliminates 99.97% more edges for indirect branches in V8 compared to NaCl-JIT. Therefore, Applicant believes that fine-grained CFI improves security significantly.

Performance Evaluation

Figure 13:
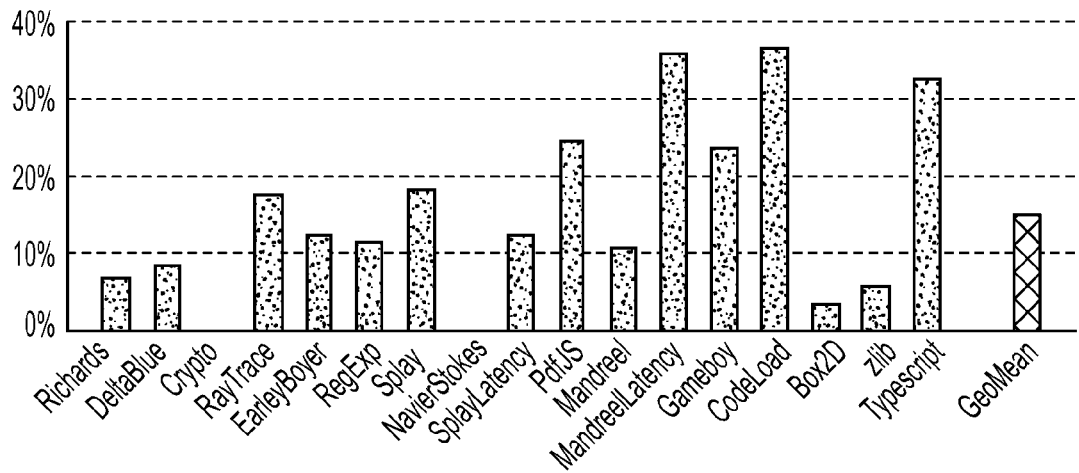
FIG. 13 depicts performance overhead imposed by Rock-JIT-hardened V8 on Octane 2 benchmarks according to an embodiment of the invention.

RockJIT incurs performance overhead because of inlined checks and JITted code verification. Applicant ran RockJIT-hardened V8 on the Octane 2 JavaScript benchmarks (https://developers.google.com/octane/benchmark, revision 33) and measured the performance overhead. Octane 2 consists of 17 tests, which measure different aspects of a JavaScript compiler, from speed of bit operations to compiler latency. Each benchmark was run ten times and the variance was less than 2%. FIG. 13 presents the performance overhead of the benchmarks. As a summary, RockJIT imposes 14.6% average overhead over all tests and the maximum overhead is 36.4%.

RockJIT's performance overhead varies over different benchmarks. Through V8's internal performance profiler, the less frequently a benchmark's execution stays in the JITted code, the more overhead RockJIT tends to incur on the benchmark. Without being bound by theory it is believed that the density of indirect branches in V8's runtime is roughly four times the density of indirect branches in its JITted code. For example, the NavierStokes benchmark (as well as Crypto) reports nearly zero performance overhead, mainly because 96% of its execution is in the JITted code. In the JITted code, over 96% execution is in optimized loops that iterate through numeric arrays, during which indirect branches and indirect memory writes are rare. As an example of the other extreme, the CodeLoad benchmark reports the largest overhead of 36.4%. The benchmark measures the compilation latency and nearly 98% of execution is performed on the V8 runtime for compilation. Other benchmarks with large JavaScript code base such as the PdfJS, Mandreel and Typescript also spend great portions of time in the V8 runtime, incurring relatively large overhead.

In general, RockJIT's performance overhead are due to three major contributors: the inlined checks in V8 runtime's code, the inlined checks in JITted code, and verification. The following table shows the performance overhead of each contributor over Octane 2 benchmarks. These overheads were generated by disabling factors one at a time. These overheads cannot be simply added because they are not independent.

TABLE 8

| Aspects | V8 Runtime Checks | JITed Code Checks | Verification |
| --- | --- | --- | --- |
| Overhead | 4.3% | 8.4% | 1.7% |

NaCl-JIT and librando tested overheads on a subset of the Octane 2 benchmarks. NaCl-JIT incurs about 51% overhead on average, and librando 265.8%. On the same subset, Rock-JIT incurs 9.0% overhead. NaCl-JIT is slower mainly because: (1) NaCl-JIT emits many more no-ops for 32-byte alignment, whose execution consumes roughly 37% extra time (in contrast, Rock-JIT requires that indirect branch addresses are four-byte aligned and does not insert many no-ops) and (2) RockJIT's DFA-based verification (1.7% overhead) is faster than NaCl's disassembly-based verification (5% overhead).

Applicant also tested RockJIT-hardened V8's performance on the MOZILLA® Kraken benchmarks (http://kraken-benchmark.mozilla.org/), and the results (depicted in FIG. 13) show that on the average of ten runs, RockJIT incurs 10.8% overhead with less than 1% variance, similar to the results on Octane 2.

Code Size Increase

With all the libraries linked, the code of the RockJIT-hardened V8 is 37.5% larger than its native counterpart, due to the CFI checks. The execution of all Octane 2 benchmarks generates around 9.9% more code in the code heap than the native V8. The reason why the JITted code has less code-size increase is that it uses less indirect branches. By contrast, V8's code uses virtual method calls heavily.

Per-Input Control-Flow Integrity (PICFI or CFI)

Embodiments of the invention enable Per-Input Control-Flow Integrity (PICFI or CFI), which is a new CFI technique that can enforce a CFG computed for each concrete input. CFI starts executing a program with an empty CFG and lets the program itself lazily add edges to the enforced CFG if such edges are required for the concrete input. The edge addition is performed by CFI-inserted instrumentation code. To prevent attackers from arbitrarily adding edges, CFI uses a statically computed all-input CFG to constrain what edges can be added at runtime. To minimize performance overhead, operations for adding edges are designed to be idempotent, so they can be patched to no-ops after their first execution. As the evaluation herein demonstrates, CFI provides better security than conventional fine-grained CFI with comparable performance overhead.

Introduction

Modern software exploitation techniques such as Return-Oriented Programming (ROP) rely on hijacking the control flow of a victim program to abnormally execute dangerous system calls (e.g., mprotect and execve). Although mainstream operating systems (i.e., Windows, Linux and OSX) have deployed mitigation methods such as Data Execution Prevention (DEP) and Address Space Layout Randomization (ASLR), control-flow hijacking is still one of the largest threats to software security. Besides those already-in-use mitigation methods, another effective way of defending against control-flow hijacking attacks is Control-Flow Integrity (CFI) as described in Abadi. In its conventional form, CFI statically computes a Control-Flow Graph (CFG) and instruments the binary code by adding checks before indirect branches (i.e., indirect calls, indirect jumps, and returns). These checks ensure any control transfer during execution never deviates from the CFG, even under attacks.

Despite effectiveness, not every CFI implementation provides the same level of protection, since CFI's security depends on the precision of the enforced CFG. The more precise the CFG is, the less choices attackers have when redirecting the control flow, the more security a particular CFI implementation provides. Coarse-grained CFI enforces a coarse-grained CFG in which there are a few equivalence classes of target addresses (or even just one equivalence class) and an indirect branch is allowed to target one of the equivalence classes. For example, binCFI allows return instructions to return to all possible return addresses. Unfortunately, the precision of coarse-grained CFI is too low and it is still possible to mount ROP attacks on coarse-grained CFI. Fine-grained CFI enforces a much higher-precision CFG; each indirect branch can have its own set of target addresses. For instance, MCFI and forward-edge CFI are compiler-based frameworks that build fine-grained CFGs from source code using high-level type information.

Whether it be coarse-grained or fine-grained CFI, a fundamental limitation of previous CFI methods is that the enforced CFGs are computed by static analysis, which has to consider all possible program inputs. Consequently, the precision of a statically computed CFG cannot be better than an "ideal" CFG, which is the minimal CFG when considering all program inputs. Computing such "ideal" CFGs is in general intractable. More importantly, even an "ideal" CFG includes unnecessary edges for a concrete program input. Therefore, our idea is to explore whether it is possible to generate a CFG for each concrete input and enforce it at runtime for that input alone. Intuitively, the per-input CFG should have a much better precision than a statically computed, all-input CFG.

Embodiments of the invention enable Per-Input Control-Flow Integrity (PICFI, or CFI), a general CFI method for generating and enforcing per-input CFGs. Since it is impossible to enumerate all inputs of a program, computing the CFG for each input and storing all per-input CFGs are infeasible. Instead, embodiments of the invention adopt the following approach: let the program start with the empty CFG and also let the program lazily compute the CFG on the fly. One idea of computing the CFG lazily is to add edges to the CFG at runtime before indirect branches need those edges. In this way, the per-input CFG generation problem becomes feasible: for an arbitrary input, the dynamically generated and enforced CFG is equivalent to what should have been computed prior to the execution.

Embodiments of the invention address to particular challenges. First, untrusted code must be prevented from arbitrarily adding edges. CFI should be able to identify those edges that shall never be added. To address this challenge, CFI first computes an all-input CFG statically. CFI's implementation relies on MCFI for the all-input CFG generation, but it could be based on any previous CFI method. Then CFI starts running the program with the empty CFG being enforced. At runtime, the program adds edges on the fly, but CFI disallows addition of any edge not included in the static, all-input CFG. In other words, the all-input CFG serves as the upper bound for what edges can be added to the enforced CFG during runtime.

The second challenge is how to achieve small performance overhead for enforcing CFI. For each indirect branch, there is a need to add the necessary edge into the CFG. This can be achieved by code instrumentation, that is, by inserting extra code that adds edges into the original program. However, such instrumentation can be costly since every time the indirect branch is executed, the edge-addition operation needs to be performed. CFI adopts a performance optimization technique, with some loss of CFG precision. This technique turns edge addition to address activation. In particular, instead of directly adding edges, CFI activates target addresses. Activating an address essentially adds all edges with that address as the target into the currently enforced CFG. The benefit of using address activation operations is that they can be made idempotent operations with some careful design. Idempotent operations can safely patched to no-ops after their first execution, minimizing performance overhead.

Embodiments of the invention enable CFI, a general CFI method for generating and enforcing per-input CFGs. Experiments show that CFI eliminates many unnecessary edges in its enforced CFGs. For SPECCPU2006 benchmarks, on average the number of edges in the enforced CFGs are only about 10.4% of the number of edges in static, all-input CFGs. Moreover, CFI's runtime overhead is small; only 3.2% on average for SPECCPU2006 benchmarks.

Embodiments of the invention provide techniques that make the per-input CFI idea efficient and secure, including lazy CFG computation, idempotent address activation, and secure code patching.

Applicant also built a framework to harden applications with CFI, and evaluated CFI's security and performance with respect to SPECCPU2006, the GOOGLE® V8 JavaScript engine, and the NGINX® HTTP server.

CFI Motivation And Overview

Before introducing the detailed system design of CFI, this section presents an overview, including its threat model, some terminology, motivation for per-input CFGs, and the benefits of address activation.

Threat Model

CFI protects user-level applications. Its trusted computing base includes the following components: the underlying software-hardware stack (including the CPU, the virtual machine if there is one, and the operating system); CFI's LLVM-based compilation toolchain; and CFI's runtime. In the entire execution of a CFI-protected program, the runtime maintains the code and data separation: those virtual memory pages containing code (including dynamically generated code) and read-only data are non-writable, and those virtual pages containing data are non-executable. Similar to other CFI work, CFI assumes that attackers have full control over all writable virtual memory pages allocated to the application. An attacker can modify any location of those pages between two consecutive instructions.

Terminology

Conceptually, a CFI method involves two kinds of control-flow graphs: a Static CFG (SCFG) that is typically computed by static analysis and an Enforced CFG (ECFG) that is consulted before indirect branches to decide whether indirect branches are allowed.

In previous CFI methods (also referred to as "conventional CFI), SCFG and ECFG are the same notion. In CFI, the SCFG and ECFG are distinct. When a program starts in CFI, the ECFG is the empty graph. As the program runs, the ECFG grows, but CFI uses the SCFG to upper bound the growth; that is, the ECFG is always a subgraph of the SCFG.

These two kinds of CFGs could be represented as two separate data structures, but CFI uses one single data structure to represent both: the SCFG is represented as two tables; the ECFG is represented by marking the SCFG with special bits, which tell what addresses have been activated.

Motivation for Per-Input CFGs

CFI's Enforced CFG (ECFG) is computed for each specific input. A toy C program listed in Appendix D illustrates its high-level idea and security benefits. The main function in the program has an if branch, whose condition depends on the number of command-line arguments. Assume that the number of command-line arguments is greater than or equal to two in a particular production environment. The main function invokes the foo function (whose code is omitted) to handle user inputs. Assume that foo's code has a stack-overflow vulnerability that enables attackers to control its return target. Apparently, this vulnerability can be easily exploited to hijack the control flow of this program. (For simplicity, ignore ASLR and stack canaries, since they are orthogonal defense mechanisms to CFI.) With conventional CFI protection, which enforces a CFG for all inputs, this particular program is still vulnerable. Notice that the main function invokes foo at two different places. As a result, both L1 and L2 are possible return addresses for foo. In conventional CFI, foo's return is always allowed to target both addresses. Therefore, even if the program executes only the else branch when deployed, attackers can still control foo's return and redirect it to L1. With appropriate data manipulation, the attacker might execute the following execve with arbitrary arguments.

With CFI, such an attack can be prevented. One possible instrumentation method is shown in Appendix E so that the program can add its required edges during execution. (Instead of edge addition, CFI actually uses address activation, which will be discussed later.) The program is started with the empty ECFG. At runtime, the else branch will be executed, but right before foo is called at line 20, the edge from foo's return to L2 is added (by calling CFI's trusted runtime at line 19). When foo returns, it is only allowed to target L2, not L1, as no such an edge has been added to the ECFG.

The example of Appendix D can also be protected by defenses that protect the stack through a shadow stack. For instance XFI (described in U. Erlingsson et al., "XFI: Software Guards for System Address Spaces" in *USENIX Symposium on Operating Systems Design and Implementation* (*OSDI*) 75-88 (2006)) adopts the shadow-stack defense to protect return addresses. This ensures that a function returns to the caller that called it. As a result, the return instruction in foo can return only to L2 when it is called in the else branch. In comparison, CFI's protection on return instructions is weaker: it ensures a return instruction in a function can return to only those call sites that have so far called the function. On the other hand, CFI offers a number of benefits than the shadow-stack approach. First, in addition to protecting returns, it also protects other indirect branches. For instance, if in an SCFG an indirect call is allowed to target two functions, say f1 and f2, but in one code path only f1's address is taken, then the indirect call will be disallowed to target f2 in CFI. Second, the shadowstack defense traditionally has compatibility issues with code that uses unconventional control-transfer mechanisms including setjmp/longjmp, exceptions, and continuations since they do not follow the rigid call-return matching paradigm. CFI offers the compatibility advantage because it can be parametrized by any SCFG and is compatible with code that uses unconventional control-transfer mechanisms.

However, since CFI does not perform address deactivation (except in rare situations when a code module is explicitly unloaded), one worry is that most of the time its ECFG grows along with the program execution. In theory, an attacker might use some malicious input to trigger the activation of all targets in an SCFG, in which case CFI falls back to conventional CFI. This is especially a concern for a long running program that keeps taking inputs, such as a web server or a web browser. However, Applicant believes CFI offers benefits even in such kind of programs, for at least the following reasons.

First, an attacker would need to find a set of inputs that can trigger the activation of all targets; this is essentially asking the attacker to solve the code coverage problem, a traditionally hard problem in software testing.

Second, preliminary experiments presented herein suggest that the number of edges in an ECFG stabilizes to a small percentage of the total number of edges in an SCFG even for long running programs that continuously take user inputs. Applicant believes this is due to several factors. First, a typical application includes a large amount of error-handling code, which will not be run in normal program execution. Second, an application may contain code that handle different configurations (like the motivating example) of execution environments. It is generally hard for a static analysis to construct a per-configuration CFG as it has to consider features such as environment variables and C macros. Finally, there may be dead code in the application that static analysis may fail to recognize. It is especially the case for functions in library code.

Third, a long running program that continuously takes user inputs typically forks new processes or pre-forks a pool of processes for handling new inputs. For instance, web servers such as APACHE™ and NGINX® pre-fork a process pool for handling web requests. In CFI, the CFG growth of a child process is independent from the CFG growth of the parent process. This setup limits the CFG growth of such programs.

From Edge Addition to Address Activation

The simple instrumentation shown in Appendix E has performance problems: each time foo is invoked, add_edge is also invoked. Although static analysis can be used to eliminate redundant edge addition calls (e.g., it might be possible to hoist such calls outside a loop), it would be hard to minimize such instrumentation code. Instead, embodiments of the invention utilize an alternative approach.

Every operation that modifies the ECFG is designed to be idempotent and eliminated by patching it to no-ops after its first execution. An idempotent operation is designed so that the effect of performing it twice is the same as the effect of performing it only once. Therefore, after the first time, there is no need to perform it again. For example, the operation on line 19 in Appendix E is idempotent: it transfers the control to the trusted runtime, and the runtime adds an edge from foo's return to L2 to the CFG. Before the runtime returns, it can patch the code at line 19 with no-ops to reduce any subsequent execution's cost. (The edge addition happens only once in the code of Appendix E, but in other examples such an operation may be executed multiple times, for instance, when it is in a loop.) Furthermore, will be explained further, using idempotent operations is also important for code synchronization when performing online code patching in multi-threaded applications running on multi-core architectures.

However, how can every edge addition be made idempotent? Consider an example of an indirect call. Before the indirect call, an edge addition could be added to register the edge required to execute the call. However, this operation is not idempotent, because the indirect call may have a different target next time it is invoked. One solution is to use an operation that adds all possible edges for the indirect call according to the SCFG. This operation is idempotent, but is incompatible with dynamic linking, during which the SCFG itself changes and new targets for the indirect call may be added.

Embodiments of the invention turn edge addition to address activation of statically known addresses so that every operation becomes idempotent. In general, only if an indirect branch's target address is activated can the address be reachable by the indirect branch. Activating an address has the same effect as adding all edges that targets the address from the current (and future) SCFG to the current (and future) ECFG. Activating a statically known address is idempotent, as activating the same address twice has the same effect as activating it only once.

CFI System Design

This section discusses the detailed system design of CFI, including how it achieves secure online code patching, how it activates addresses for each kind of indirect branch target addresses, and how it is made compatible with typical software features.

Secure Code Patching

Idempotent address-activation operations allow CFI to patch the operations with no-ops after their first execution, but the patching should be securely performed. Online code patching typically implies granting the writable permission to code pages, which enables code-injection attacks. To avoid such risks, embodiments of the invention adopt the approach of RockJIT described herein that securely handles JITted code manipulation and generalize it to patch regular code (i.e., non-JITted code).

Figure 15:
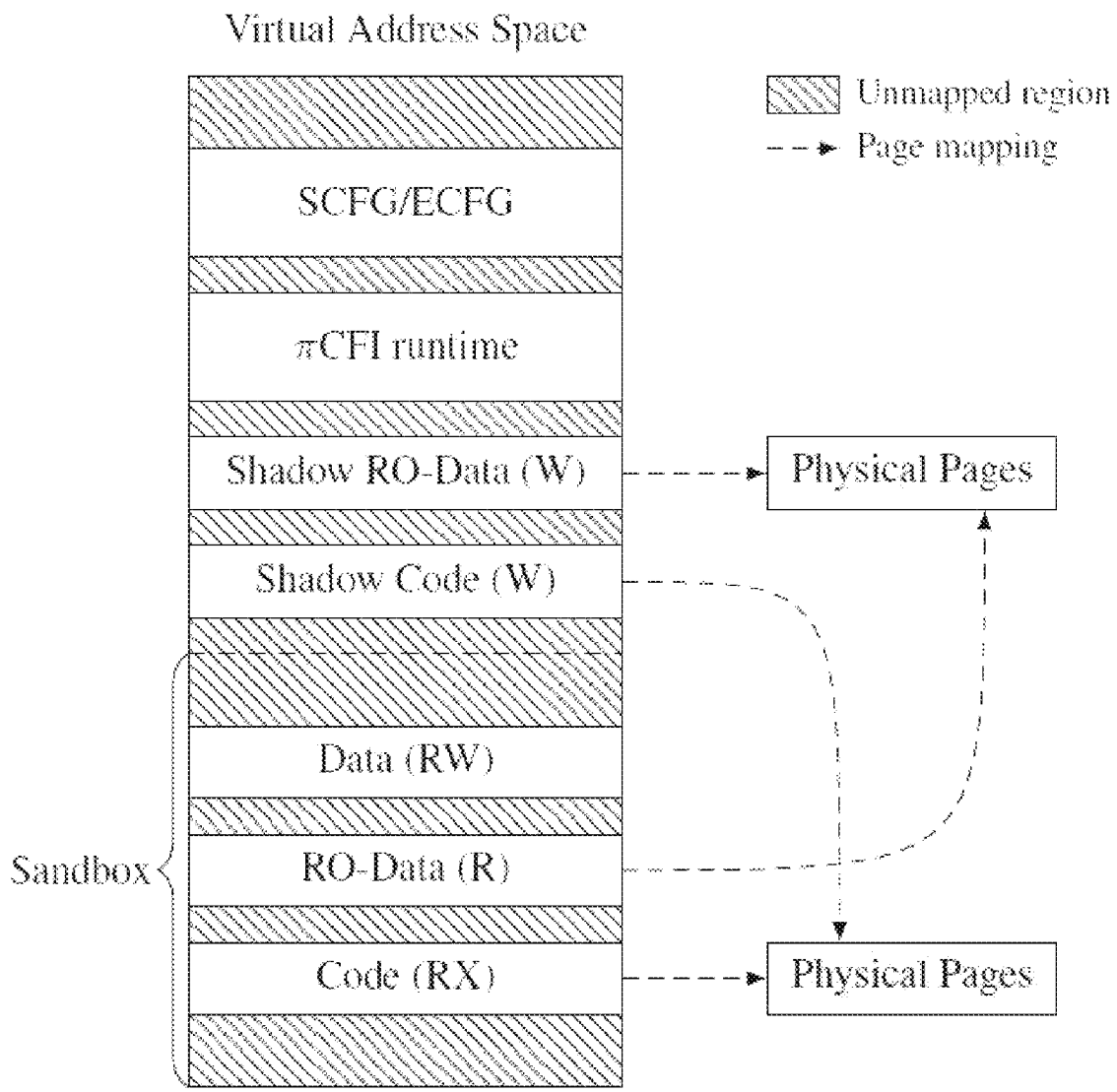
FIG. 15 depicts memory layout of CFI according to an embodiment of the invention. "R", "W" and "X" appearing in parentheses denote the Readable, Writable, and eXecutable memory page permissions, respectively. The "RO-" prefix means Read-Only.

FIG. 15 shows the memory layout of an application protected with CFI. The application should have been compiled and instrumented by CFI's compilation toolchain. The application and all its instrumented libraries are loaded into a sandbox created by the CFI runtime. The sandbox can be realized using Software-based Fault Isolation (SFI) as described in R. Wahbe et al., "Efficient Software-based Fault Isolation" in *Proc. of the 14th ACM Symposium on Operating Systems Principles* (*SOSP* '93) 203-16 (1993) or some hardware support. For example, one can instrument all memory writes to ensure their targets always stay within the sandbox. Code in the sandbox cannot arbitrarily execute or write memory pages outside the sandbox, but has to invoke trampolines provided by the CFI runtime; these trampolines allow the untrusted code to escape the sandbox safely. The runtime also maintains the invariant that no memory pages in the sandbox are writable and executable simultaneously, at any time. In addition, the runtime guarantees that read-only data, such as jump tables, are not writable. Outside the sandbox stay the CFI runtime and the encoded SCFG/ECFG. The encoded SCFG/ECFG is read-only from the application's perspective, but writable by the runtime.

To enable secure patching, CFI's runtime allocates another set of writable virtual memory pages, called shadow code pages, outside the sandbox and maps these pages to exactly the same physical pages as the application's code pages inside the sandbox. The shadow code pages are writable by the runtime, but cannot be modified by the application since those pages are outside the sandbox. In this way, CFI maintains the invariant that no memory pages in the sandbox are writable and executable at the same time. More importantly, the CFI runtime can securely perform code patches on the shadow code pages and these changes are synchronously reflected in the application's code pages since they are mapped to the same physical pages.

FIG. 15 also shows parallel mapping of the read-only data. They contain runtime-adjustable read-only data, especially the GOT.PLT data in Linux. The PLT (Procedure Linkage Table) contains a list of entries that contain glue code emitted by the compiler to support dynamic linking. Code in the PLT entries uses target addresses stored in the GOT.PLT table (GOT is short for Global Offset Table). The GOT.PLT table is adjusted during runtime by the linker to dynamically link modules. However, security weakness also results from the GOT.PLT table's writability, as demonstrated by a recent attack. To address this security concern, CFI sets the GOT.PLT table to be always read-only inside the sandbox and creates outside the sandbox a shadow GOT.PLT table, which is mapped to the same physical pages as the in-sandbox GOT.PLT table. All changes to the GOT.PLT table are therefore performed by the CFI runtime, which ensures that each entry's value is the address of either the dynamic linker or the address of a function whose name is the same as the corresponding PLT entry's name.

Address Activation

CFI dynamically activates indirect branch targets. When a target address is submitted to CFI's runtime for activation, it consults the encoded SCFG to check if the address is a valid target address; if so, the runtime activates the address (by enabling it in the ECFG) so that future indirect branches can jump to it.

For each target address, there is a time window during which that target can be activated—from the beginning of program execution to immediately before the target is first used in an indirect branch; in the case when a target is never used in a program run, the time window is from the beginning of program execution to infinity. One way to think of conventional CFI is to view it as an approach that eagerly activates all target addresses at the beginning of program execution. CFI, on the other hand, wants to delay address activation as late as possible to improve security. One natural approach would be to always activate a target immediately before its first use. This approach, however, does not take into account other constraints, which are discussed as follows.

The first constraint is idempotence. For efficiency, every address-activation operation should be idempotent so that it can be patched to no-ops after its first execution. This constraint implies that not every address activation can happen immediately before its first use. If an address-activation operation is inserted for the actual target immediately before the indirect call, that operation is not idempotent because the target might be different next time the indirect call is invoked.

The second constraint is atomic code updates. It is tricky to perform online code patching on modern multi-core processors. If some code update by a thread is not atomic, then it is possible for another thread to even see corrupted instructions. Therefore, a CFI patch operation must be atomic, which means that any hardware thread should either observe the address-activation operation before the patch or the no-ops after the patch. Fortunately, x86 CPUs manufactured by both Intel and AMD support atomic instruction stream changes if the change is of eight bytes and made to an eight-byte aligned memory address. Embodiments of the invention take advantage of this hardware support to implement CFI's instrumentation and patching. It is important to stress that it is possible that the code in memory has been atomically patched by one thread, but the code cache for a different hardware thread might still contain the old address-activation operation. Consequently, the address-activation operation may be re-executed by the second thread. However, since all our address-activation operations are idempotent, their second execution does not produce further effect. Once again, idempotence produces further benefits.

Therefore, the issue of when to activate a target address has to be carefully studied considering the aforementioned constraints. CFI selects different design points for different kinds of target addresses, including return addresses, function addresses, virtual method addresses, and addresses associated with exception handlers. Each kind of these target addresses has different activation sites, which will be discussed next. Without losing generality, x86-64 Linux is used as an example to discuss the technical details below. As discussed below, activation of target addresses is the result of a careful collaboration between CFI's compilation toolchain, its loader, and its runtime.

Return Addresses

The most common kind of indirect-branch targets is return addresses. A return address could be activated immediately before a return instruction. However, it would not be an idempotent operation as the same return instruction may return to a different return address next time it is run. Instead, CFI activates a return address when its preceding call instruction is executed. The activation procedure is different between direct calls and indirect calls, which are discussed separately next.

Appendix F illustrates the activation procedure for a direct call. The following steps can be used to activate return address L following a direct call to foo.

First and before the direct call, CFI's compilation toolchain inserts appropriate no-ops (line 3) to align L to an 8-byte aligned address. CFI's implementation is based on MCFI as described herein, which requires all target addresses to be 8-byte aligned.

Second, when the code is loaded into memory by CFI's loader (part of its runtime), the immediate operand of the call instruction (line 4) is replaced with an immediate called patchstub, as shown in Appendix F, branch (b). Therefore, the call is redirected to patchstub, whose code is listed in Appendix G.

Third, when line 4 is reached after the program starts execution, the control transfers to patchstub. It firstly pops the return address L from the stack (line 2 in Appendix G) to % r11, which can be used as a scratch register thanks to the calling convention of x86-64 Linux. It then invokes return_ address_activate provided by CFI's runtime. (The % gs segment register points to an area outside of the CFI sandbox.)

Fourth, the runtime, once entered, saves the context and activates L by updating the ECFG. CFI reuses MCFI's tables for encoding an SCFG. There is a Tary table in MCFI that lists all valid target addresses. Activating an address is associated with an update to the Tary table to enable the address as will be discussed in greater detail herein.

Fifth, the runtime then copies out eight bytes from [L-8, L), modifies the immediate operand of the call instruction to target foo, and uses an 8-byte move instruction to patch the code, as shown in Appendix F, branch (c). Finally, the runtime restores the context and jumps to line 4 in Appendix F, branch (c) to execute the patched call instruction.

A few points are worth further discussion. First, since any return address is 8-byte aligned and any direct call instruction is 5-byte long, 8-byte atomic code update is always feasible and consequently all threads either call patchstub or foo. Second, the ECFG update should always be conducted prior to the update that changes patchstub to foo; otherwise another thread would be able to enter foo's code and execute foo's return instruction without L being activated.

Finally, the patchstub uses the stack to pass the address to be activated and therefore there is a small time window between the call to patchstub and the stack-pop instruction in patchstub during which an attacker can modify the return address on the stack. However, the most an attacker can do is to activate a different valid target address because the CFI runtime would reject any invalid target address according to the SCFG. More importantly, because there are CFI checks before return instructions, CFI will never get violated. If one wants to guarantee that CFI always activates the intended address, one simple way would be to load the return address to a scratch register and pass the value to patchstub via the scratch register. This would add extra address loading instructions and no-ops after patching. Another way would be to have a dedicated patch stub for each call instruction (instead of sharing a patch stub among all call instructions and relying on the stack for passing the return address). This solution would cause roughly the same runtime overhead, at the cost of additional code bloat (around 14% on average for SPEC-CPU2006 C/C++ benchmarks).

CFI's approach for activating return addresses following indirect calls is discussed next. Only indirect calls through registers are emitted in CFI-compiled code, as all indirect calls through memory are translated to indirect calls through registers. The instrumentation is listed in Appendix H. The cfi-check at line 3 is an operation that performs CFI checks and can be implemented using any CFI (e.g., MCFI as disclosed herein). The cfi-check also contains no-ops to align L to an 8-byte aligned address. In addition, CFI inserts a 5-byte no-op (line 4) at compile-time (Appendix H, branch (a)) so that at load time a direct call to the patchstub can be inserted (Appendix H, branch (b)). Note that in this case when patchstub gets called its stack pop instruction (line 2 in Appendix G) does not load L to % r11, but the runtime can straightforwardly calculate L by rounding % r11 to the next 8-byte aligned address. After the return address is activated by the runtime, the patchstub call is patched back to the 5-byte no-op (Appendix H, branch (c)). The patch is atomic because an indirect call instruction through a register in x86-64 is encoded with either 2 or 3 bytes; therefore, the patched bytes will always stay within [L-8, L).

Function Addresses

As discussed before, the target address cannot be activated immediately before an indirect call because of the idempotence requirement. Instead, CFI activates the address of a function at the place when the function's address is taken. Consider an example shown in Appendix I, where foo and bar are global functions. foo's address is taken at line 3, while bar's address is taken at line 5. For those functions whose addresses are taken in the global scope, such as foo, CFI activates their addresses at the beginning of execution; hence no additional instrumentation and patching are required for these function addresses. For functions whose addresses are taken elsewhere, such as bar, CFI inserts address-activation operations right before their address-taking sites. As an example, Appendix J presents part of the code that is compiled from the example in Appendix I and the lea instruction at line 4 in Appendix J takes the address of bar. Before the instruction, CFI's compilation inserts a direct call to patch-stub_at (at line 2 in Appendix J, branch (a)), which is another stub similar to Appendix G but invokes a separate runtime function) to activate bar's address. However, a mechanism is required to translate the value passed on stack into bar's address, which is achieved by the label ("_picfi_bar") inserted at line 3. The label consists of a special prefix ("_picfi_") and the function's name (bar), so the runtime can look up the symbol table to translate the stack-passed value to the function's name during execution, and then looks up the symbol table again to find the address of bar. Appropriate no-ops are also inserted before line 2 so that the 5-byte patch-stub_at call instruction ends at a 8-byte aligned address to enable atomic patching. The patching replaces the call instruction with a 5-byte no-op shown in Appendix J, branch (b).

C++ code can also take the address of non-virtual methods. Such an address is activated in the same way as a function address; that is, it is activated at the place where the address is taken.

C++ Virtual Method Addresses

CFI activates a virtual method's address when the first object of the virtual method's class is instantiated. Consider the code example in Appendix K. Methods A::bar and B::foo's addresses are activated at line 13, because class B has foo declared and inherits the bar method from class A. Method A::foo's address is activated at line 15.

In CFI, the address-activation operations for virtual method addresses are actually inserted into the corresponding classes' constructors so that, when a constructor gets first executed, all virtual methods in its virtual table are activated. For example, suppose Appendix L, branch (a) shows the prologue of A's constructor A::A, which is 8-byte aligned. When the code is loaded into memory, as shown in Appendix L, branch (b), CFI's runtime changes the prologue to a direct call to patchstub_vm (which is another stub similar to patchstub in Appendix G but jumps to a separate runtime function to activate virtual methods) so that, when A::A is firstly entered, the virtual method activation is carried out. Note that in this case when patchstub_vm is executed, its stack pop instruction (same as line 2 in Appendix G) does not set %r11 as the constructor's address, so the runtime needs to calculate it by taking the length of the patchstub_vm call instruction (5 bytes) from %r11. After its first execution, the runtime patches the direct call back to its original bytes, and executes the actual code of A::A. Only five bytes are modified in the patching process, and all these five bytes reside in an 8-byte aligned slot; therefore, the patch can be performed atomically.

The above virtual method activation procedure assumes a class object is always constructed by calling the class's constructor. Although most classes have constructors, there are exceptions. For example, due to optimization, some constructor might be inlined. For such rare cases, CFI activates the addresses of the associated virtual methods at the beginning of program execution.

Exception Handler Addresses

Exception handlers include code that implements C++ catch clauses and code that is generated by the compiler to release resources during stack unwinding. (Compilers in x86-64 Linux implement exception handling following the Itanium C++ ABI. More details are available at https://mentorembedded.github.io/cxx-abi/abi.html). Consider an exception handler's address activated when the function where the exception handler resides gets executed for the first time. Therefore, same as how CFI instruments and patches C++ constructors, CFI also instruments those functions that have exception handlers when loading the code into memory and patches the code back to its original bytes when such functions first get executed.

Compatibility Issues

As a defense mechanism, CFI transforms an application to insert CFI checks and code for address activation, as well as performing online patching. This section discusses how this process is made compatible with typical programming conventions, including dynamic linking and process forking.

The first compatibility issue concerns dynamic linking. The ability to load/unload libraries dynamically is essential to modern software and makes it possible to share commonly used libraries across applications. CFI's implementation is based on MCFI, designed to support modularity features such as dynamic linking and JIT compilation. Whenever a new library is dynamically loaded, MCFI builds a new Static CFG (SCFG) based on the original application together with the new library; the new SCFG will be installed and used from that point on.

CFI's design of using address activation is also compatible with dynamic linking, based on the following reasoning. When an address, say addr, is activated, all edges with addr as the target in the SCFG are implicitly added to the Enforced CFG (ECFG). Now suppose a library is dynamically loaded. It triggers the building of a new SCFG, which may allow more edges to target addr, compared to the old SCFG. However, since addr has already been activated, the current ECFG allows an indirect branch to target addr through newly added edges. Therefore, address activation accommodates dynamic linking.

CFI also supports dynamic library unloading. When a library is unloaded, all indirect branch targets inside the library's code are marked inactive. This prevents all threads from entering the library's code because there should be no direct branches targeting the library. (This is generally true for libraries, but not for JITted code, in which case it is necessary to check the remaining code for this condition.) However, there might be threads currently running or sleeping in the library's code. Hence, it is unsafe to harvest the library code pages at this moment; otherwise those pages could be refilled with newly loaded library code and the sleeping threads might resume and execute unintended instructions. To safely handle this situation, CFI asynchronously waits until it observes that all threads have executed at least one system call or runtime trampoline call; each syscall instruction in the libc is instrumented to increment a per-thread counter when a syscall instruction is executed. Then the runtime can safely reclaim the memory allocated for the library.

The second compatibility issue concerns process forking. In Linux, the fork system call is used to spawn child processes. For example, the NGINX® HTTP server forks child processes to handle user requests. During forking, all non-shared memory pages are copied from the parent process to the child process (typically using a copy-on-write mechanism for efficiency). As a result, the child process has its own copy of the SCFG/ECFG data structure. This is good for security, because the child and the parent processes can grow their ECFGs separately as each has its own private copy of the data structure.

However, there is an issue with respect to the code pages. Recall that, to achieve secure code patching, the actual code pages and the shadow code pages are mapped to the same physical pages (as shown in FIG. 15). In Linux, this is achieved by using mmap with the MAP_SHARED argument. As a result, the actual code pages are considered shared and the fork system call would not make private copies of the code pages in the child process. Consequently, one would encounter the situation of having shared code pages and private CFG data structures between the parent and the child processes. This would create the following possibility: the parent would activate an indirect branch target address, update its private ECFG, and patch the code; the child would lose the opportunity to patch the code and update its private ECFG, since the address-activation instrumentation would have been patched by the parent; the child's subsequent normal execution would be falsely detected as CFI violation.

To solve this problem, CFI intercepts the fork system call, and before it is executed CFI copies the parallel-mapped code pages to privately allocated memory and unmaps those pages. Then fork is invoked, which copies the private code pages as well. The runtimes in both processes next restore the parallel mapping in their own address spaces using the saved code bytes. This solution allows the child process to have its private code pages and CFGs. The same solution applies to those parallel-mapped read-only data pages (shown in FIG. 15). It should be pointed out that this solution does not support fork calls issued in a multi-threaded process, because the unmapping would crash the program if other threads are running. However, to the best of Applicant's knowledge, multi-threaded processes rarely fork child processes due to potential thread synchronization problems.

Implementation

The CFI toolchain has two tools: an LLVM-based C/C++ compiler, which is built on top of MCFI's compiler for code instrumentation and generation of SCFG-related metadata; and a runtime that loads instrumented modules and monitors their execution.

The CFI compiler is modified from Clang/LLVM-3.5, with a diff result of 4,778 lines of changes. In summary, the MCFI-specific changes to LLVM propagate metadata such as class hierarchies and type information for generating the SCFG. The metadata are inserted into the compiled ELF as new sections. The instrumentation for indirect branches follows MCFI. For better efficiency, Applicant applied the sandboxing method of ISBoxing as described in L. Deng et al., "ISboxing: An Instruction Substitution Based Data Sandboxing for x86 Untrusted Libraries" in 455 *IFIP Advances in Information and Communication Technology* 386-400 (2015) to instrument indirect memory writes. In detail, the sandbox for running applications is within [0, 4 GB), and the CFI compiler instruments each indirect memory write instruction by adding a 0x67 prefix, which is the 32-bit address-override prefix. The prefix forces the CPU to clear all upper 32 bits after computing the target address. The CFI-specific changes to LLVM identify function address-taking instructions and insert calls to patchstub_at before these instructions (as detailed in the "CFI System Design" section herein). In addition, each CFI-protected application runs with instrumented libraries. Therefore, Applicant also modified and instrumented standard C/C++ libraries, including libc++, libc++ abi, libunwind, and the musl libc.

The CFI runtime consists of 11,002 lines of C/assembly code. The runtime is position-independent, and is injected to an application's ELF as its interpreter. When the application is launched, the Linux kernel loads and executes the runtime first. The runtime then loads the instrumented modules into the sandbox region, creates shadow regions, and patches the code appropriately (as detailed in the "CFI System Design" section herein). The SCFG is generated using the metadata in the code modules, but initially all target addresses in the SCFG are made inactive (this encodes an implicit empty ECFG). The details of how SCFG is encoded can be found in the MCFI paper. As a summary, the SCFG is encoded as two tables: the Bary table remembers the IDs of all indirect branches; the Tary table records the IDs of all indirect branch targets. All IDs are 8-byte long and stored at 8-byte aligned addresses to enable atomic updates. For each indirect branch, MCFI's instrumentation retrieves its ID from Bary, and the intended target ID from Tary, then compares whether the IDs are equal to detect CFI violation. In each ID, there are several validity bits at fixed positions and with special values; invalid IDs do not have those bit values at those positions. As a result, to mark a target address inactive, CFI simply changes the values of those validity bits to wrong values in the target's relevant Tary ID. During an address-activation operation, the CFI runtime atomically marks the address active (if it is a valid target address) by changing the values of the validity bits back and patches the address-activation operation to no-ops.

Security Analysis

CFI protects programs by enforcing a fine-grained per-input CFG. This provides multiple security benefits. First of all, when there is dead code in a program, its ECFG makes dead code unreachable. For instance, if a C function is never called, then it is unreachable at runtime. This property makes remote exploits nearly impossible for programs that never invoke critical system functions (e.g., execve) as most attacks rely on invoking such functions to cause damage. Examples of such programs include compression tools (e.g., gzip), bind (a widely-used DNS server), and memcached, etc.; they do not invoke execve-like functions.

For a program that does invoke critical functions, CFI improves its security by making it hard for attackers to redirect the control flow from the first instruction an attacker can control (e.g., an indirect branch) to their targeted sensitive function. In particular, CFI reduces the number of indirect branch edges available for attackers. Using MCFI's CFG as the baseline, Applicant next present experiments that measure CFI's indirect branch edge reduction.

On a machine running 64-bit Linux, Applicant compiled and instrumented all 19 SPECCPU2006 C/C++ benchmark programs with the O3 optimization. Applicant then measured the statistics of the enforced CFGs using the reference data sets that are included in the benchmarks. If a benchmark program has multiple reference data sets, Applicant chose the one that triggered the most address-activation operations (i.e., the worst case). The results are shown in Table 9. The "RAA" column shows the percentage of return addresses that are activated at the end of the program over the return addresses in MCFI's CFG; the "FAA" column shows the percentage of activated function addresses over function addresses in MCFI's CFG (note that not all functions are indirect-branch targets in MCFI's CFG; if a function's address is never taken, then MCFI does not allow the function to be called via an indirect branch); the "VMA" column shows the percentage of activated virtual method addresses; the "EHA" column shows the percentage of activated exception handlers. Finally, the "IBEA" column shows the percentage of indirect-branch edges in CFI's ECFG at the end of the program over the indirect-branch edges in MCFI's CFG. Those C programs (i.e., those above 444.namd in the table) do not have virtual methods or exception handlers; therefore, VMA and EHA measurements are not applicable to them.

TABLE 9

ECFG statistics of SPECCPU2006 C/C++ programs

| Benchmark | RAA | FAA | VMA | EHA | IBEA |
|---|---|---|---|---|---|
| 400.perlbench | 19.9% | 83.2% | N/A | N/A | 15.4% |
| 401.bzip2 | 5.0% | 41.9% | N/A | N/A | 6.1% |
| 403.gcc | 27.0% | 91.7% | N/A | N/A | 20.3% |
| 429.mcf | 5.5% | 45.0% | N/A | N/A | 7.4% |
| 433.milc | 13.6% | 41.9$ | N/A | N/A | 9.6% |
| 445.gobmk | 35.4% | 98.1% | N/A | N/A | 64..4% |
| 456.hmmer | 9.2% | 32.9% | N/A | N/A | 9.4% |
| 458.sjeng | 9.8% | 46.3% | N/A | N/A | 8.3% |
| 462.libquantum | 7.2% | 39.3% | N/A | N/A | 8.3% |
| 464.h264ref | 19.5% | 49.5% | N/A | N/A | 20.6% |
| 470.lbm | 4.5% | 40.0% | N/A | N/A | 7.4% |
| 482.sphinx | 18.9% | 44.8% | N/A | N/A | 14.8% |
| 444.namd | 5.3% | 84.3% | 61.5% | 3.2% | 3.5% |
| 447.dealII | 7.1% | 95/5% | 32.2% | 13.0% | 5.5% |
| 450.soplex | 8.9% | 87.7% | 69.8% | 19.5% | 7.6% |
| 453.povray | 12.9% | 92.1% | 62.9% | 5.3% | 9.6% |
| 471.omnetpp | 19.1% | 94.8% | 55.4% | 37.7% | 13.9% |
| 473.astar | 5.3% | 87.4% | 61.2% | 2.2% | 6.4% |
| 483.xalancbmk | 14.3% | 94.5% | 56.5% | 27.9% | 13.5% |

As can be seen in the table, only a small percentage (10.4% on average) of indirect branch edges are activated in the ECFG. Most programs activate less than 20% of indirect branch edges, which severely limits attackers' capability of redirecting control flow. The low percentage of edge activation is mostly attributed to the low percentage of return address activation as return addresses are the most common kind of indirect-branch targets. Function addresses are activated in higher percentages. The reason is that C programs tend to take addresses of functions early in the program and store them in function-pointer tables. From the perspective of security engineering, it would be better to refactor such programs to dynamically take function addresses, following the principle of least privilege.

Figure 16:
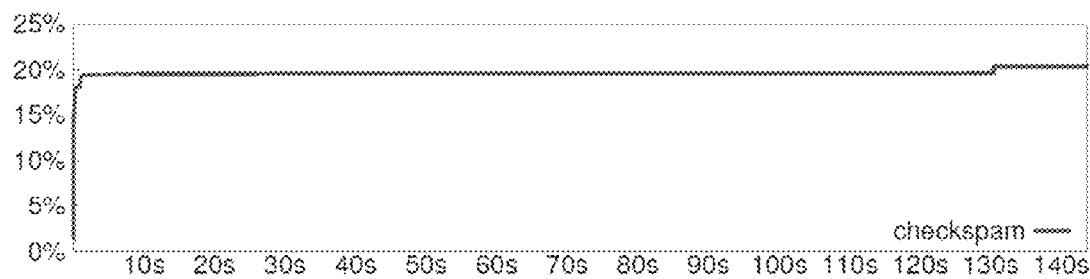
FIG. 16 depicts the growth of targeted addresses for the 400.perlbench benchmark according to an embodiment of the invention.
Figure 17:
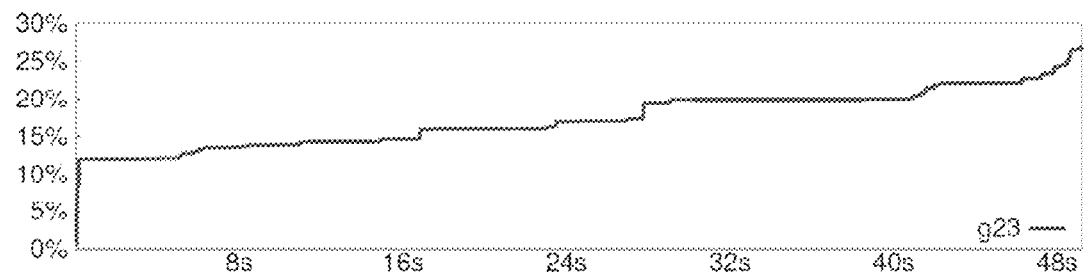
FIG. 17 depicts the growth of activated target addresses for the 403.gcc benchmark according to an embodiment of the invention.

Applicant also studied how the ECFG grows over time. For each benchmark, Applicant measured the number of activated indirect branch targets over time. For most benchmarks (18 out of 19), most address activation happens at the beginning of execution and grows slowly (and stabilizes in most cases). For example, FIG. 16 shows the target activation of the 400.perlbench program when tested on its longest-running data set checkspam. The X-axis is the execution time and the Y-axis is the proportion of activated indirect branch targets. However, Applicant also observed an outlier, 403.gcc when tested over the g23 data set, whose address activation curve is drawn in FIG. 17. As can be seen, the address activation shows steep growth even at the end; on the other hand, it does not activate more target addresses compared to other input data sets, which trigger similar ECFG growth as 400.perlbench.

Figure 18:
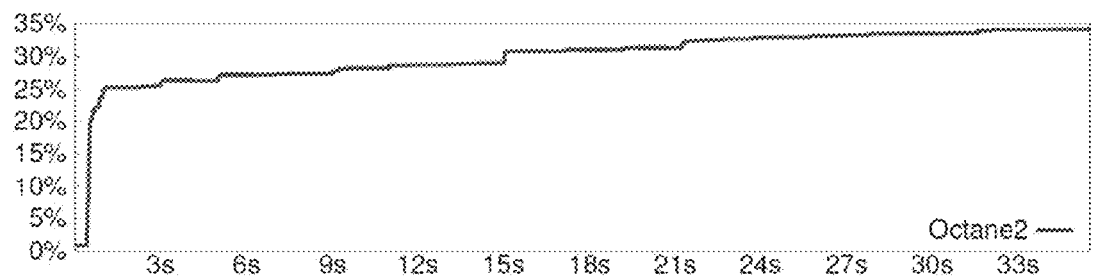
FIG. 18 depicts the growth of activated target addresses for the GOOGLE® V8 JavaScript engine according to an embodiment of the invention.
Figure 19:
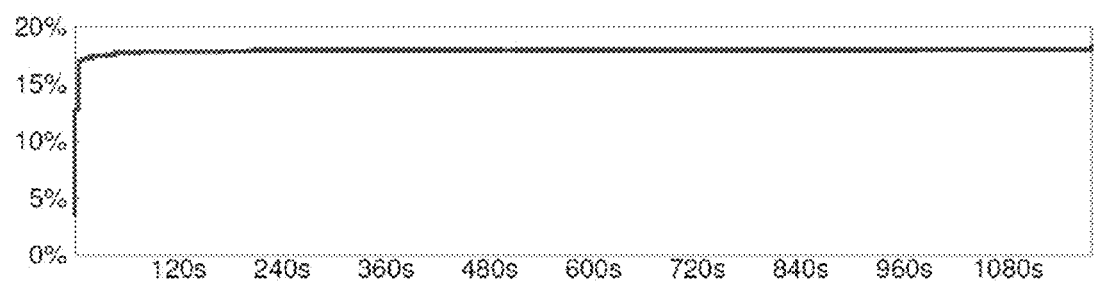
FIG. 19 depicts the growth of activated target addresses in the NGINX® HTTP server according to an embodiment of the invention.

Applicant also built and instrumented the GOOGLE® V8 JavaScript engine as a standalone executable. Applicant ran the V8 software on three benchmark suites: Sunspider 1.0.2, Kraken 1.1, and Octane 2. Applicant collected ECFG statistics for those benchmark suites in Table 10. The first "No input" row shows the statistics when no input is fed to V8. Note that the benchmarks, especially Octane 2 (around 373K lines of JavaScript code) activates only slightly more targets than the no-input case. Therefore, given the size and diversity of benchmarks, Applicant hypothesizes that other JavaScript programs will not activate significantly more addresses than those benchmarks. The ECFG growth curve of V8 when tested over Octane 2 is shown in FIG. 18, from which one can see that the number of target activation grows very slowly after the initial burst, similar to what was observed on SPEC benchmarks.

TABLE 10

ECFG statistics of the GOOGLE ® V8 JavaScript engine

| Benchmark | RAA | FAA | VMA | EHA | IBEA |
|---|---|---|---|---|---|
| No input | 15.6% | 86.5% | 41.4% | 2.2% | 17.8% |
| Sunspider 1.0.2 | 23.1% | 86.8% | 56.2% | 2.2% | 24.9% |
| Kraken 1.1 | 21.8% | 86.9% | 53.9% | 2.2% | 23.2% |
| Octane 2 | 26.6% | 87.0% | 59.2% | 2.2% | 28.6% |

Figure 14:
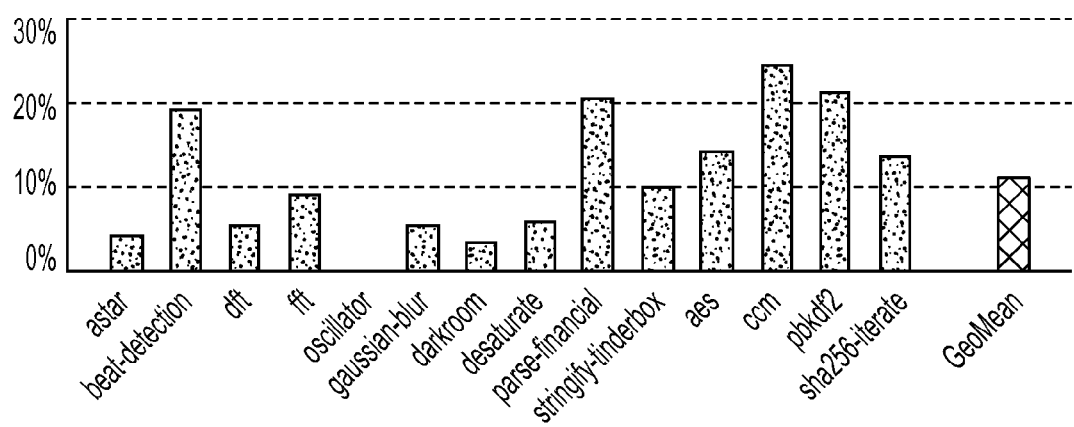
FIG. 14 depicts performance overhead imposed by Rock-JIT-hardened V8 on Kraken 1.1 benchmarks.

One security concern about CFI is that a long running program that keeps taking user input may be able to trigger the activation of all target addresses. For evaluation, Applicant used CFI to protect an NGINX® server and used the sever to host a WORDPRESS® site. Then one of the authors used almost all features of the WORDPRESS® tool for a session of about 20 minutes. Table 11 shows the address activation results. Applicant configured the NGINX® server to use two processes: the master process was responsible for initialization and handling administrators' commands while a worker process created by the master processed all user inputs. CFI's design allows the master and worker to have different ECFGs; therefore, their address activation results are different. FIG. 14 shows the target activation growth curve for the worker process. Similar to other tested programs, the percentage quickly stabilized. This preliminary experiment shows that CFI provides security benefits even for long running programs. As discussed before, Applicant believes this is because programs have a large amount of unused code for a particular input, including exception-handling code, library code, and code for handling different configurations.

TABLE 11

ECFG statistics of the NGINX ® HTTP server's master and worker processes

| Benchmark | RAA | FAA | IBEA |
|---|---|---|---|
| Master | 9.3% | 67.1% | 8.6% |
| Worker | 14.9% | 73.5% | 13.2% |

Next, Applicant briefly discusses how common software attacks are mitigated in CFI.

The first common software attack is via code injection. CFI enforces DEP (Data Execution Prevention) at all times; its runtime enforces this by intercepting and checking all systems calls that may change memory protection, including mmap, mprotect, and munmap. Therefore, code injection attacks are impossible for programs that do not generate code at runtime. For programs that generate code on-the-fly (i.e., JIT compilers), their JITted code manipulation is performed by the trusted runtime following the work of RockJIT. Attackers may still inject code into the code heap, but the injected code never violates CFI due to online code verification. For example, the injected code should never contain any system call instruction. Further, JIT spraying attacks as discussed in D. Blazakis, "Interpreter Exploitation" in *Proceedings of the 4th USENIX Conference on Offensive Technologies* 1-9

(2010) are also prevented, because CFI never allows indirect branches to_target the middle of instructions.

The second common software attack is ROP attacks. As used herein, a "ROP gadget" is defined to be a sequence of instructions with an indirect branch as the last instruction. All CFI techniques can eliminate some gadgets because they disallow gadgets starting from the middle of instructions specified in the CFG. However, gadget elimination is not a good metric to differentiate CFI techniques; it does not measure how difficult it is to chain gadgets into an attack. Logically, the less edges are available for attackers, the more difficult it is for them to chain gadgets effectively. Therefore, Tables 9-11 show evidence that CFI provides stronger protection against ROP attacks than conventional CFI.

Performance Evaluation

As a security mechanism, CFI's performance overhead should be small to have a chance of being adopted in practice. CFI's design is geared toward having a small runtime overhead, including the use of idempotent operations and online code patching. Next, Applicant reports experiments on evaluating the performance overhead of CFI, including runtime and space overhead. Of the two, having a small runtime overhead is much more important. All performance numbers were measured on a system with an INTEL® XEON® E3-1245 v3 processor, 16 GB memory, and 64-bit Ubuntu 14.04.2. For comparison, Applicant also measured MCFI's performance overhead using the same machine and compilation configuration.

Figure 20:
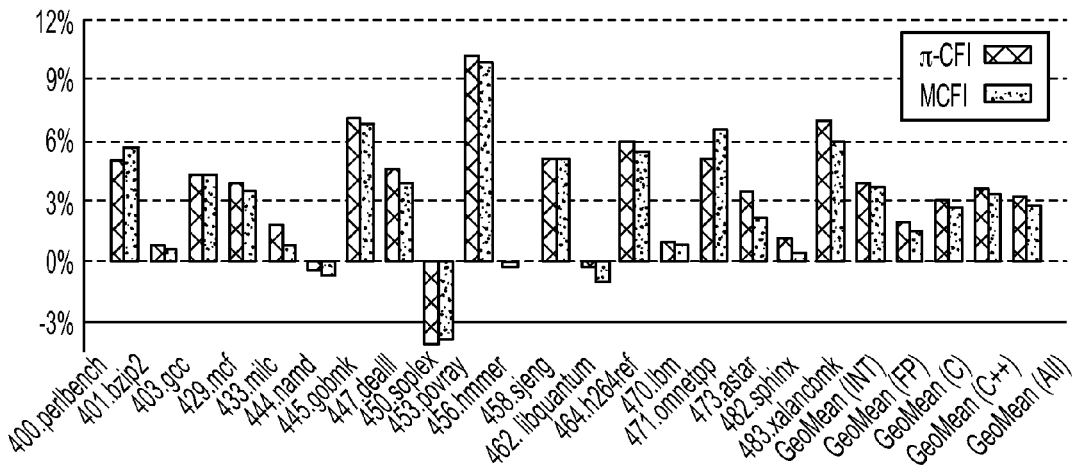
FIG. 20 depicts CFI and MCFI runtime overhead on SPEC-CPU2006 C/C++ benchmarks according to an embodiment of the invention.

The SPECCPU2006 benchmark suite consists of 19 C/C++ benchmarks. Applicant compiled all of them at the O3 optimization level using the CFI compilation toolchain and measured their execution time increase compared to their counterparts that were compiled with a native Clang/LLVM compiler. Each benchmark was executed three times over its own reference data sets with a less than 1% standard deviation. The runtime-overhead results are presented in FIG. 20. On average, CFI incurs 3.9% overhead on integer benchmarks and 3.2% overhead over all benchmarks (including both integer and floating-point benchmarks). In comparison, MCFI incurs 3.7% and 2.9% on the same benchmark sets (based on the use of a more efficient technique as described in Deng). Compared to MCFI, CFI causes a small increase of runtime overhead, due to address-activation operations and execution of no-ops after patching.

The figure also shows that there are a few benchmarks (e.g., 450.soplex) that have slight speedups after CFI's protection. To investigate the phenomenon, Applicant replaced the instrumentation with no-ops and still observed speedups that can be attributed to the extra alignments added during compilation. Another note is that the runtime overhead is positively correlated with the frequency of indirect branches executed in a run. Applicant measured the correlation using the Pearson correlation coefficient and obtained a result of 0.74, which indicates strong correlation.

Due to instrumentation, the code size for benchmarks is enlarged by 5.6% to 67.4%, with an average of 21.2%. Code size of C++ programs increases more than C programs, due to a higher density of indirect branches.

Figure 21:
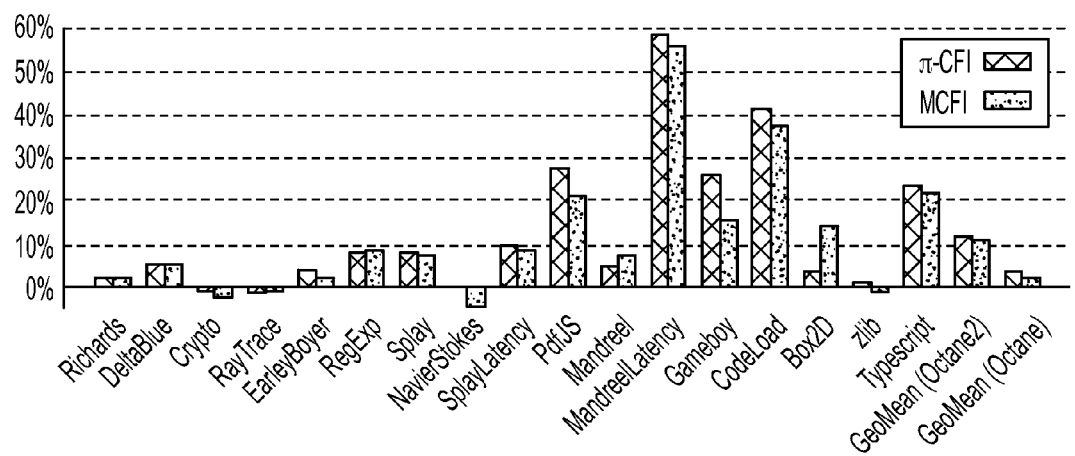
FIG. 21 depicts CFI and MCFI runtime overhead on Octane 2 benchmarks using the GOOGLE® V8 JavaScript engine according to an embodiment of the invention.

Following the RockJIT approach described herein, Applicant instrumented the V8 JavaScript engine (version 3.29.88.19 on x86-64) using CFI's compiler with the release mode, and measured the performance overhead on the Octane 2 benchmarks. FIG. 21 shows the runtime-overhead results. On average, 11.8% runtime overhead is incurred by CFI in comparison to 10.7% by MCFI. As analyzed before, CFI still costs a bit more time than MCFI due to online address activation and patched no-ops. Also, Applicant separately calculated runtime-overhead results for the subset of benchmarks that were included in Octane 1 (the predecessor of Octane 2) because past work used Octane 1 for evaluation. CFI incurs only 3.1% overhead over them on average, which is slightly higher than MCFI (or RockJIT). Compared to other JIT-compiler hardening work, such as NaCl-JIT, librando, and SDCG, CFI incurs less overhead and provides better security. In terms of code bloat, the code size of V8 is increased by around 35.7% after the CFI instrumentation.

Applicant compiled nginx-1.4.0 with the O2 optimization and measured its throughput. Using the ab command, Applicant found that the binary hardened by CFI had about the same maximum throughput as the native version. The code size is increased by about 22.3%.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

APPENDIX A

PSEUDO CODE FOR IMPLEMENTING UPDATE TRANSACTIONS

```
1   void TxUpdate ( ) {
2       acquire(updLock);
3       globalVersion = globalVersion + 1;
4       updTaryTable( );
5       sfence;
6       updBaryTable( );
7       release(updLock);
8   }
9   void updTaryTable( ) {
10      // allocate a table and init to zero
11      allocateAndInit(newTbl);
12      for (addr=CodeBase;addr<CodeLimit;addr+=4) {
13          ecn=getTaryECN(addr);
14          if (ecn >= 0) {
15              entry=(addr – CodeBase) / 4;
16              newTbl[entry]=0x1; // init reserved bits
17              setECNAndVer(newTbl, entry, ecn, globalVersion);
18          }
19      }
20      copyTaryTable(newTbl, TaryTableBase);
21      free(newTbl);
22  }
```

APPENDIX B

IMPLEMENTATION OF CHECK TRANSACTIONS FOR X86-64 RETURN INSTRUCTIONS

```
1   TxCheck {
2       popq      %rcx
3       movl      %ecx, %ecx
4   Try:
5       movl      %gs:ConstBaryIndex, %edi
6       movl      %gs:(%rcx), %esi
7       cmpl      %edi, %esi
8       jne       Check
9       jmpq      *%rcx
10  Check:
11      testb     $1, %sil
12      jz        Halt
```

APPENDIX B-continued

IMPLEMENTATION OF CHECK TRANSACTIONS FOR X86-64 RETURN INSTRUCTIONS

```
13      cmpw    %di, %si
14      jne     Try
15   Halt:
16      hlt
17   }
```

APPENDIX C

C++ FUNCTION POINTERS

```
1  typedef int (*Fp)( );
2  Fp fp = &getpagesize;
3  std::cout << (*fp)( );
4  ...
5  typedef int (Animal::*memFp)( ) const;
6  Animal *animal = new Pigeon( );
7  memFp memfp = &Animal::age;
8  std::cout << (animal->*memfp)( );
```

APPENDIX D

MOTIVATING EXAMPLE FOR PER-INPUT CFGS

```
1   void foo(void) {
2     /*We omit code that handles user inputs. The
3       code contains a stack buffer overflow so
4       that attackers can control the following
5       return instruction's target. */
6     ...
7     return;
8   }
9   int main(int argc, char *argv[ ]) {
10    if (argc < 2) {
11      foo( );
12      L1:
13      ... /* irrelevant code, omitted */
14      execve(...); /* arguments omitted */
15    } else {
16      foo( );
17      L2: ...
18    }
19  }
```

APPENDIX E

EDGE-ADDITION INSTRUMENTATION FOR THE MOTIVATING EXAMPLE

```
1   void foo(void) {
2     /* We omit code that handles user inputs. The
3       code contains a stack buffer overflow so
4       that attackers can control the following
5       return instruction's target. */
6     ...
7     return;
8   }
9   int main(int argc, char *argv[ ]) {
10    if (argc < 2) {
11      /* connect foo's return to L1 */
12      add_edge(foo, L1); /* Instrumentation */
13      foo( );
14      L1:
15      ... /* irrelevant code, omitted */
16      execve(...); /* arguments omitted */
17    } else {
18      /* connect foo's return to L2 */
19      add_edge(foo, L2); /* Instrumentation */
20      foo( );
21      L2: ...
22    }
23  }
```

APPENDIX F

ACTIVATING A RETURN ADDRESS IN CFI FOLLOWING A DIRECT CALL INSTRUCTION

```
1  // (a) before      // (b) after          // (c) after
2  // loading         // loading            // patching
3  nop                nop                   nop
4  call foo           call patchstub        call foo
5  L:                 L:                    L:
```

APPENDIX G

PATCH STUB FOR ACTIVATING ADDRESSES

```
1  patchstub:
2  pop %r11
3  jmp %gs:return_address_activate
```

APPENDIX H

ACTIVATING RETURN ADDRESS IN CFI: FOLLOWING AN INDERICT CALL INSTRUCTION

```
1  // (a) before      // (b) after          // (c) after
2  // loading         // loading            // patching
3  cfi-check %r8      cfi-check %r8         cfi-check %r8
4  nop                call patchstub        nop
5  call *%r8          call *%r8             call *%r8
6  L:                 L:                    L:
```

APPENDIX I

EXAMPLE CODE FOR FUNCTION ADDRESS ACTIVATION

```
1  void foo(void) { }
2  void bar(void) { }
3  void (*fp) = &foo;
4  int main( ) {
5    void (*bp) = &bar;
6    fp( );
7    bp( );
8  }
```

APPENDIX J

CFI'S INSTRUMENTATION FOR ACTIVATING A FUNCTION ADDRESS

```
1  // (a) after loading       // (b) after patching
2  call patchstub_at          nop // 5-byte nop
3  _picfi_bar:                _picfi_bar:
4  lea bar(%rip), %rcx        lea bar(%rip), %rcx
```

APPENDIX K

EXAMPLE C++ CODE FOR DEMONSTRATING VIRTUAL METHODS' ADDRESS ACTIVATION

```
1   class A {
2   public:
3     A() { }
4     virtual void foo(void) { }
5     virtual void bar(void) { }
6   };
7   class B : A {
8   public:
9     B() : A() { }
10    virtual void foo(void) { }
11  };
```

APPENDIX K-continued

EXAMPLE C++ CODE FOR
DEMONSTRATING VIRTUAL METHODS' ADDRESS ACTIVATION

```
12   int main( ) {
13       B *b = new B;
14       b->foo( );
15       A *a = new A;
16       a->foo( );
17   }
```

APPENDIX L

EXAMPLE CFI CODE FOR ACTIVATING A VIRTUAL METHOD
BY INSTRUMENTING AND PATCHING A C++ CLASS
CONSTRUCTOR A::A, WHICH IS 8-BYTE ALIGNED

```
1  // (a) before       // (b) after          // (c) after
2  // loading          // loading            // patching
3  A::A:               A::A:                 A::A:
4  push %rbp           call patchstub_vm     push %rbp
5  mov %rsp,%rbp       ... // omitted        mov %rsp,%rbp
```

The invention claimed is:

1. A method of controlling execution of a computer program, the method comprising the following runtime steps:
   parsing code to identify one or more indirect branches;
   creating a branch ID data structure that maps an indirect branch location to a branch ID, which is the indirect branch's equivalence class ID;
   creating a target ID data structure that maps a code address to a target ID, which is an equivalence class ID to which the address belongs; and
   prior to execution of an indirect branch including a return instruction located at an address:
      obtaining the branch ID associated with the return address from the branch ID data structure;
      obtaining the target ID associated with an actual return address for the indirect branch from the target ID data structure;
      comparing the branch ID and the target ID; and
      if the branch ID and the target ID differ, preventing execution of the indirect branch.

2. The method of claim 1, wherein the code resides in multiple modules.

3. The method of claim 2, wherein the multiple modules are dynamically loaded.

4. The method of claim 3, wherein each of the multiple modules are separately compiled prior to dynamic loading.

5. The method of claim 3, wherein each of the multiple modules are separately instrumented prior to dynamic loading.

6. The method of claim 1, wherein each step is performed at runtime.

7. The method of claim 1, further comprising:
   if the branch ID and the target ID match, permitting execution of the indirect branch.

8. The method of claim 1, wherein the branch ID data structure is an array.

9. The method of claim 1, wherein the target ID data structure is an array of target IDs indexed by code addresses.

10. The method of claim 1, wherein the array contains '0' bits at an index associated with a code address if the code address is not a possible indirect-branch target.

11. The method of claim 1, wherein the branch IDs and the target IDs are stored with special bit values in the least significant bit of each byte encoding.

12. The method of claim 1, further comprising:
    loading the code into a region of memory; and
    designating that region as executable and readable, but not writable.

13. The method of claim 1, wherein the branch ID data structure and the target ID data structure are stored separately from the code.

14. The method of claim 1, wherein the code is written in C.

15. The method of claim 1, wherein the code is written in C++.

16. A method of controlling execution of a computer program by a Just-In-Time (JIT) compiler, the method comprising the following steps:
    maintaining a shadow code heap outside the JIT compiler's sandbox the JIT compiler's code heap stored in the JIT compiler's sandbox;
    as a code region is loaded into the shadow code heap and the JIT compiler's code heap:
       parsing the code region to identify one or more pseudo-instruction start addresses, indirect branch target addresses, and direct branch target addresses and adding those addresses to a pseudo-instruction start addresses (PSA) set, an indirect branch target addresses (IBT) set, and a direct branch target (DBT) addresses set;
       verifying that:
          all members of the IBT set and the DBT set are also members of the PSA set;
          all indirect branches and memory-write instructions in the new code region are appropriately instrumented;
          all direct branches in the new code region jump to addresses in the DBT set; and
          the new code region contains only instructions corresponding to the JIT compiler;
       upon successful completion of the verifying step, copying the new code region into the shadow code heap:
       updating a branch ID data structure that maps an indirect branch location to a branch ID and a target ID data structure that maps an address to a target ID with the addresses from the IBT set; and
    prior to execution of an indirect branch including a return instruction located at an address:
       obtaining the branch ID associated with the return address from the branch ID data structure;
       obtaining the target ID associated with an actual return address for the indirect branch from the target ID data structure;
       comparing the branch ID and the target ID; and
       if the branch ID and the target ID differ, preventing execution of the indirect branch.

17. The method of claim 16, wherein the shadow code heap is readable and writable, but not executable.

18. The method of claim 16, wherein the pseudo-instruction start addresses, the indirect branch target addresses, and the direct branch target addresses are stored as bitmaps.

19. The method of claim 16, wherein the verifying step further comprises iterating through a Deterministic Finite Automata (DFA) of all possible allowed instruction encoding.

20. The method of claim 16, wherein the DFA is generated from a trie structure of all possible allowed instruction encoding.

21. The method of claim 16, further comprising:
    upon receiving a request to delete the code region from the shadow code heap and the JIT compiler's code heap:

determining whether direct branches outside of the code region target any instructions within the code region;

removing code-region-related entries from the branch ID data structure and the target ID data structure; and determining whether any threads are running or sleeping in the code region.

22. The method of claim 21, wherein the determining whether any threads are running or sleeping in the code region step further comprises waiting until each thread enters runtime code after execution of the removing step.

23. The method of claim 21, wherein the determining whether any threads are running or sleeping in the code region step further comprises:

checking each one of a plurality of counters, each counter associated one of the threads after execution of the removing step;

incrementing the associated counter each time the associated thread enters the runtime code; and checking whether each one of a plurality of counters has changed.

24. The method of claim 16, further comprising:

generating a fine-grained control flow graph (CFG) for the JIT compiler prior to runtime.

25. A method of controlling execution of a computer program, the method comprising the following runtime steps:

parsing code to identify one or more indirect branches;

creating a branch ID data structure that maps an indirect branch location to a branch ID, which is the indirect branch's equivalence class ID;

creating a target ID data structure that maps an address to a target ID, which is an equivalence class ID to which the address belongs; and prior to execution of an indirect branch including a return instruction located at an address:

obtaining the branch ID associated with the return address from the branch ID data structure;

obtaining the target ID associated with an actual return address for the indirect branch from the target ID data structure;

marking a link between the branch ID and the return address as active in the branch ID data structure and the target ID data structure;

comparing the branch ID and the target ID; and if the branch ID and the target ID differ, preventing execution of the indirect branch.

26. The method of claim 25, further comprising:

if the branch ID and the target ID match, permitting execution of the indirect branch.

27. The method of claim 25, wherein the marking step comprises invoking an idempotent operation.

28. The method of claim 25, wherein the branch ID data structure is an array.

29. The method of claim 25, wherein the target ID data structure is an array.

\* \* \* \* \*